(12) United States Patent
Son et al.

(10) Patent No.: US 9,106,177 B2
(45) Date of Patent: Aug. 11, 2015

(54) METHOD AND SYSTEM FOR SENSORLESS CONTROL OF AN ELECTRIC MOTOR

(75) Inventors: Yo Chan Son, Torrance, CA (US); Leah Dunbar, Brighton, MI (US); Silva Hiti, Redondo Beach, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 890 days.

(21) Appl. No.: 13/344,241

(22) Filed: Jan. 5, 2012

(65) Prior Publication Data

US 2013/0175955 A1 Jul. 11, 2013

(51) Int. Cl.
| | |
|---|---|
| *H02P 21/00* | (2006.01) |
| *H02P 21/14* | (2006.01) |
| *H02P 21/13* | (2006.01) |
| *H02P 27/06* | (2006.01) |

(52) U.S. Cl.
CPC .............. *H02P 21/14* (2013.01); *H02P 21/13* (2013.01); *H02P 27/06* (2013.01)

(58) Field of Classification Search
CPC ... H02P 21/0035; H02P 21/06; H02P 21/146; H02P 2207/05; Y02T 10/643
See application file for complete search history.

(56) References Cited

U.S. PATENT DOCUMENTS

| 6,396,236 | B1 * | 5/2002 | Luukko ......................... 318/700 |
|---|---|---|---|
| 6,763,622 | B2 | 7/2004 | Schulz et al. | |
| 6,841,969 | B1 | 1/2005 | Schulz et al. | |
| 6,894,454 | B2 | 5/2005 | Patel et al. | |
| 6,924,617 | B2 | 8/2005 | Schulz et al. | |
| 7,088,077 | B2 | 8/2006 | Nagashima et al. | |
| 8,340,848 | B2 * | 12/2012 | Son et al. ......................... 701/22 |
| 2002/0005674 | A1 * | 1/2002 | Hayashi ......................... 310/168 |
| 2009/0140676 | A1 | 6/2009 | Son et al. | |

FOREIGN PATENT DOCUMENTS

| CN | 101445065 A | 6/2009 |
|---|---|---|
| CN | 102055403 A | 5/2011 |
| CN | 102195551 A | 9/2011 |
| CN | 103199789 A | 7/2013 |
| DE | 10355423 A1 | 7/2005 |
| DE | 102008058872 A1 | 7/2009 |
| WO | 9965137 A1 | 12/1999 |

OTHER PUBLICATIONS

The German Patent and Trade Mark Office, Office Action for German Patent Application No. 10 2012 223 441.1, mailed Apr. 11, 2014.
State Intellectual Property Office of the People's Republic of China, Office Action in Chinese Patent Application No. 201310001621.7, mailed Dec. 3, 2014.

* cited by examiner

*Primary Examiner* — Shawki S Ismail
*Assistant Examiner* — Zoheb Imtiaz
(74) *Attorney, Agent, or Firm* — Ingrassia Fisher & Lorenz, P.C.

(57) ABSTRACT

Methods and systems for controlling an electric motor are provided. An estimated rotor flux angular position error is generated based on estimated back electromotive force (EMF) values, and based on the estimated rotor flux angular position error, an estimated rotor flux angular position, an estimated electrical synchronous frequency and/or an estimated rotor frequency can be generated.

20 Claims, 12 Drawing Sheets

METHOD AND SYSTEM FOR SENSORLESS CONTROL OF AN ELECTRIC MOTOR

TECHNICAL FIELD

The present invention generally relates to the control of electric motors. More specifically, the present invention relates to a method and system for sensorless control of an electric motor, such as one in used in a drive system of an automobile.

BACKGROUND OF THE INVENTION

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another actuator, to drive the wheels.

Traditional motor control systems normally include a feedback device or angular position sensor, such as a resolver or encoder, to provide angular frequency (or "speed") and angular position information about the motor. Feedback devices and associated interface circuits increase the costs of a motor control system, and these costs may become prohibitive in high volume applications such as the production of automobiles. Additionally, an angular position sensor and its associated wiring harness increase the complexity and assembly time of an electric drive system in a vehicle.

Electric vehicles powered by fuel cells, batteries and hybrid systems that include electric motors are becoming more common in the automotive market. As production volumes for electric vehicles increase, the cost of feedback devices and associated interface circuits will become significant. Automakers are therefore always striving to cut costs and reduce the number of parts for a vehicle. The removal of a feedback device for an electric motor control system will lead to significant cost reductions for an electric vehicle.

Hybrid electric and electric vehicles today utilize numerous electric motor control technologies such as the vector control of electric motors. A vector motor control scheme is a computationally intensive motor control scheme that maps the phase voltages/currents of a three-phase motor into a two axis coordinate system. The structure used to excite an electric motor using a vector control scheme is a typical three-phase power source inverter including six power transistors that shape the output voltage to an electric motor. Vector control requires angular position information for the rotor, which is normally obtained via a feedback device or angular position sensor. The objective of the sensorless control is to obtain the rotor angular position information utilizing electromagnetic characteristics of an AC machine, eliminating the angular position sensor and its associated interface circuits.

Methods and systems for sensorless control of an electric motor are described in United States Patent Application Publication Number 2009/0140676 entitled "METHOD AND SYSTEM FOR SENSORLESS CONTROL OF AN ELECTRIC MOTOR," filed Nov. 29, 2007, which is incorporated by reference herein in its entirety. The methods and systems for sensorless control are applicable to permanent magnet AC machines, such as a 3-phase permanent magnet motor.

Notwithstanding these advances, it is desirable to provide an improved method and system for sensorless control of an electric motor that can be used in conjunction with electric machines including at least permanent-magnet machines, synchronous reluctance machines, and induction machines. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method for controlling an electric motor is provided. Based on estimated back electromotive force (EMF) values, and estimated rotor flux angular position error, at least two of: an estimated rotor flux angular position, an estimated electrical synchronous frequency and/or an estimated rotor frequency can be generated.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
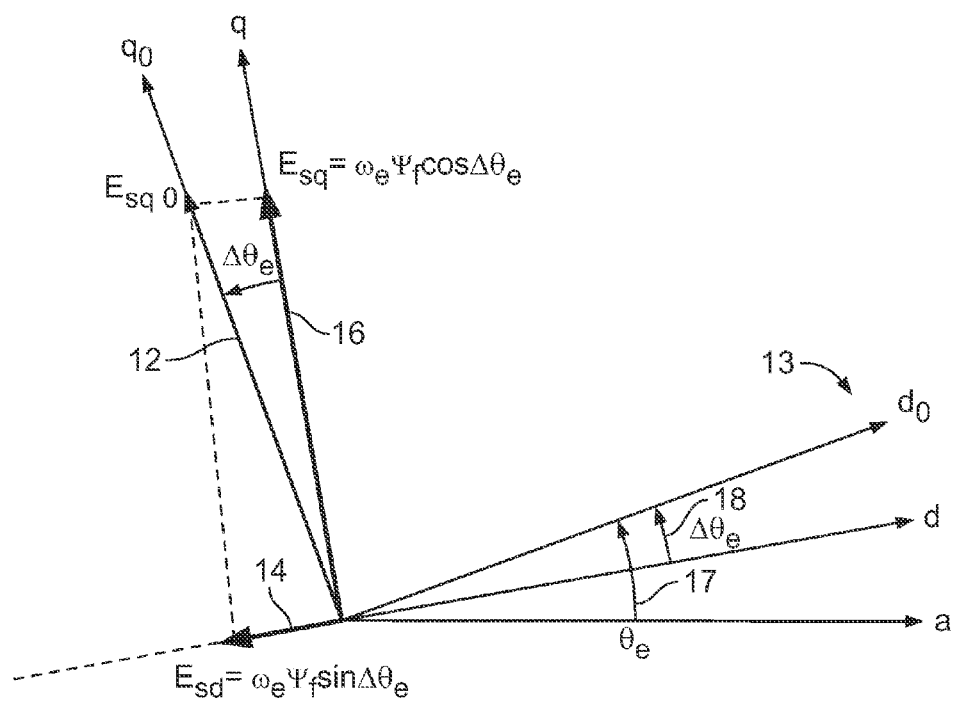
FIG. 1 is a diagram that illustrates a back EMF projection in a synchronously rotating reference frame.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of a multi-phase system that includes a multi-phase alternating current machine without using angular speed or angular position sensor. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of a multi-phase system that includes a multi-phase alternating current machine without using angular speed/frequency or angular position sensor, as described herein. As such, these functions may be interpreted as steps of a method for controlling operation of a multi-phase system that includes a multi-phase alternating current machine without using angular speed or angular position sensor. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Types of AC Machines and Corresponding Machine Parameters

Prior to describing the disclosed embodiments in detail, some of the different types of alternating current machines and their features will now be described below.

As used herein, the term "alternating current (AC) machine" generally refers to "a device or apparatus that converts electrical energy to mechanical energy or vice versa using alternating current." Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current.

An AC machine typically includes a stationary stator having coils supplied with alternating current to produce a rotating magnetic field, and a rotor attached to an output shaft. The rotor generates the magnetic flux, and it is driven by the torque that is determined by the relation between the stator and rotor flux. The stator that has a stator resistance ($r_s$) and a inductance ($L_s$). Some of the parameters that can be measured or determined with respect to any type of AC machine include stator terminal voltages ($v_s$), which can be decomposed into d-axis stator terminal voltage ($v_{sd}$), q-axis stator terminal voltage ($v_{sd}$), stator currents ($i_s$), which can be decomposed into d-axis stator current ($i_{sd}$) and q-axis stator current ($i_{sd}$), stator flux ($\Psi_s$), which can be decomposed into d-axis stator flux ($\Psi_{sd}$) and q-axis stator flux ($\Psi_{sq}$), and rotor flux ($\psi_f$) as observed at the stator winding.

Some of the parameters that can be used to characterize performance in any type of electric machine include rotor flux angular position ($\theta_e$) seen at the stator terminal, rotor angular position ($\theta_r$) seen at the stator terminal, and the rotor frequency ($\omega_r$) in radians/second. The rotor frequency ($\omega_r$) in radians/second is equal to the product of rotor angular speed ($\omega_{rm}$) in radians/second and the number of pole-pairs (PP) of the electric machine (i.e., $\omega_r = \omega_{rm} \times PP$).

AC machines can generally be classified as being either synchronous AC machines and asynchronous AC machines.

In a synchronous machine, the rotating magnetic field of the stator imposes a torque on the magnetic field of the rotor causing it to rotate steadily. The magnetic field on the rotor is generated either by current delivered through slip rings or by a permanent magnet. It is called synchronous because at steady state, the angular speed of the rotor matches the angular speed of the rotating magnetic field in the stator. A synchronous machine can rotate exactly at the supply frequency or a sub-multiple of the supply frequency since it does not rely on induction.

Synchronous AC machines can include permanent magnet AC (PMAC) machines and synchronous reluctance machines. PMAC machines include surface mount permanent magnet machines (SMPMMs) and interior permanent magnet machines (IPMMs). Synchronous machines have a stator inductance ($L_s$) that can be decomposed into a d-axis stator inductance ($L_d$) and q-axis stator inductance ($L_q$). The rotor flux angular position ($\theta_e$) seen at the stator terminal is equal to the rotor angular position ($\theta_r$) seen at the stator terminal. In a synchronous machine, electrical synchronous frequency ($\omega_e$) in radians/second is equal to rotor frequency ($\omega_r$) in radians/second. In addition, it is noted that in the case of permanent magnet AC machine, the rotor flux ($\psi_f$) as observed at the stator winding is caused by a permanent magnet.

In an asynchronous machine, a magnetic field on the rotor of this motor is created by a current induced in the rotor. To do this, stator windings are arranged so that when energized with they create a rotating magnetic field that induces current in the rotor conductors. These currents interact with the rotating magnetic field, causing rotational motion of the rotor. An asynchronous machine (e.g., an induction machine), runs slightly slower or faster than the supply frequency. The ratio between the angular speed of the magnetic field as seen by the rotor (slip angular speed) and the angular speed of the stator's rotating field is unitless and is called slip. Asynchronous AC machines include induction machines.

An asynchronous AC machine has a stator inductance ($L_s$), a rotor inductance ($L_r$) and magnetizing inductance ($L_m$). In an asynchronous AC machine, a stator transient inductance ($\sigma L_s$) is defined per expression (1) as follows:

$$\sigma L_s = L_s - \frac{L_m^2}{L_r}. \quad (1)$$

In addition, for an asynchronous machine, the rotor flux angular position ($\theta_e$) at the stator terminal does not always equal the rotor angular position ($\theta_r$) at the stator terminal ($\theta_e \neq \theta_r$). In addition, the electrical synchronous frequency ($\omega_e$) in radians/second is equal to the sum of the rotor frequency ($\omega_r$) in radians/second and a slip frequency ($\omega_{s1}$) in radians/second (i.e., $\omega_e = \omega_r + \omega_{s1}$). In the case of an induction motor (IM) the rotor flux ($\psi_f$) at the stator winding is induced.

When a d-axis is aligned to rotor flux angular position (as observed at a stator winding), stator voltages of AC machines (regardless of the type of AC machine) can be computed using expressions (2) and (3) as follows:

$$v_{sd} = r_s i_{sd} + \frac{d}{dt}\Psi_{sd} - \omega_e \Psi_{sq} \quad (2)$$

$$v_{sq} = r_s i_{sq} + \frac{d}{dt}\Psi_{sq} + \omega_e \Psi_{sq}, \quad (3)$$

where $\Psi_{sd}$ and $\Psi_{sq}$ are the stator fluxes, which are different depending on the motor type.

However, as shown in expressions (4) and (5), the stator fluxes ($\Psi_{sd}$ and $\Psi_{sq}$) can be decomposed.

$$\Psi_{sd} = \psi_d + \psi_f \quad (4)$$

$$\Psi_{sq} = \psi_q, \quad (5)$$

where $\psi_d$ and $\psi_q$ are considered as the stator winding fluxes at d-axis and q-axis windings without the presence of the rotor flux, respectively, and $\psi_f$ is the flux established by the rotor (or stated differently, the rotor flux as observed at the stator winding).

Since the d-axis is aligned at the spatial location of the rotor flux, expression (5) does not include any term related to $\psi_f$. Table 1 (below) summarizes different flux types for different AC machine types.

TABLE 1

| | Synchronous AC machine | Asynchronous AC machine |
|---|---|---|
| d-axis winding flux $\psi_d$ | $L_d i_{sd}$ | $\sigma L_s i_{sd}$ |
| q-axis winding flux $\psi_q$ | $L_q i_{sq}$ | $\sigma L_s i_{sq}$ |
| d-axis rotor flux $\psi_f$ | $L_m i_f$ | $L_m \Psi_{rd}/L_r$ |

Column 1 of Table 1 lists the d-axis winding flux ($\psi_d$), the q-axis winding flux ($\psi_q$) and the rotor flux ($\psi_f$) as observed at the stator winding. For each type flux, column 2 summarizes some of the corresponding motor parameters for synchronous AC motors, and column 3 summarizes some of the corresponding motor parameters for asynchronous AC motors. In column 1 of Table 1, $i_f$ is the field current in the synchronous motor, and it could be supplied by the external field regulation circuit (as the case of wound-rotor synchronous machine), or by the permanent magnet (as the case of the permanent-magnet ac machine). In case of a synchronous reluctance motor that is another case of the synchronous machine, there is no magnet for thr rotor flux, and the flux decomposition of expression (4) in a synchronous reluctance motor can be defined per expressions (6) and (7) as follows:

$$i_{sd} = I_{sd0} + \tilde{i}_{sd} \quad (6)$$

$$\Psi_{sd} = \psi_d + \psi_f = L_d I_{sd0} + L_d \tilde{i}_{sd} \quad (7)$$

For a synchronous reluctance motor, there is a minimum d-axis current $I_{sd0}$ required to provide the flux for the angular speed and position estimation even with zero torque, and $\tilde{i}_{sd}$ can be treated as $i_{sd}$ in Table I. $I_{sd0}$ corresponds to $i_f$ in Table I, and it could vary with respect to the torque as long as it provides enough voltage for the angular speed and position estimation.

Assuming that d-axis rotor flux in Table I varies slowly, expressions (2) and (3) are rewritten in expressions (8) and (9) as follows:

$$v_{sd} \cong r_s i_{sd} + \frac{d}{dt}\psi_d - \omega_e \psi_q \quad (8)$$

$$v_{sq} = r_s i_{sq} + \frac{d}{dt}\psi_q + \omega_e \psi_d + \omega_e \psi_f \quad (9)$$
$$= r_s i_{sq} + \frac{d}{dt}\psi_q + \omega_e \psi_d + E_{sq0}$$

$E_{sq0}$ is the back EMF as a result of the d-axis rotor flux $\psi_f$ in Table 1 multiplied by the electrical synchronous frequency $\omega_e$ ($E_{sq0} = \omega_e \times \psi_f$). Expression (8) does not have a d-axis winding flux ($\psi_d$) component when the d-axis is perfectly aligned to the rotor flux angular position.

FIG. 1 is a diagram that illustrates a back EMF projection in a synchronously rotating reference frame (also referred to herein as the synchronous reference frame) when the estimated d-axis is not exactly aligned to the true rotor flux position ($\Delta\theta_e \neq 0$).

In FIG. 1, $d_0$-axis 13 and $q_0$-axis 12 are the true axes that are aligned to the actual rotor flux. The d-axis 14 and q-axis 16 are estimated axes. The q-axis BEMF ($E_{sq0}$) vector is projected onto d-axis 14 and q-axis 16. In FIG. 1, the d-axis 14 and q-axis 16 are rotated by an angle ($\Delta\theta_e$) 18 with respect to the $d_0$-axis 13 and $q_0$-axis 12 that corresponds to an estimated rotor flux angular position error. When implemented in a control system, the estimated rotor flux angular position error ($\Delta\theta_e$) 18 of the back EMF ($E_{sq0}$) vector results in non-zero d-axis stator terminal voltage ($v_{sd}$) voltage and a reduced q-axis stator terminal voltage ($v_{sd}$) (as shown in equation (12) below).

Machine equations of expressions (8) and (9) can be approximated as expressions (10) and (11), respectively.

$$v_{sd} = r_s i_{sq} + \frac{d}{dt}\psi_q - \omega_e \psi_q - E_{sd} \quad (10)$$

$$v_{sq} = r_s i_{sq} + \frac{d}{dt}\psi_q + \omega_e \psi_d + E_{sq}, \quad (11)$$

where the d-axis BEMF ($E_{sd}$) 14 and the q-axis BEMF ($E_{sq}$) 16 can be represented in expressions (12) and (13) as follows:

$$E_{sd} = E_{sq0} \sin \Delta\theta_e = \omega_e \psi_f \sin \Delta\theta_e \quad (12)$$

$$E_{sq} = E_{sq0} \cos \Delta\theta_e = \omega_e \psi_f \cos \Delta\theta_e \quad (13).$$

It is noted that expressions (10) through (13) characterize the machine equations with a presumption that the rotating angular speed of both axes are same as electrical synchronous frequency ($\omega_e$).

In accordance with the disclosed embodiments, methods, systems and apparatus for controlling operation of a multi-phase system that includes a multi-phase alternating current machine without using angular speed or position sensor. In accordance with some of the disclosed embodiments, a digitally controlled high-speed sensorless flux observer is provided for sensorless control of the system during high angular speed machine operation.

Based on the commanded or measured motor voltages and the measured currents, a motor model calculates the flux increment at each sampling cycle. The motor voltage can be directly measured, or it could be taken from the output of the current controller.

A flux model calculates the winding flux based on the motor current. Estimated flux can be compared with the measured flux to generate a flux error.

The calculated flux increment and flux error are fed into the flux observer that uses these inputs to estimate flux and back electromotive force (BEMF). To time the updates made to flux and back electromotive force (BEMF) measurements, the flux observer utilizes a pulse width modulation (PWM) signal that is used drive the electric motor.

The estimated BEMF is used to determine an estimated angular position error of the estimated BEMF.

An angular speed and position observer uses the estimated angle angular position error of the estimated BEMF to generate estimated rotor angular speed and/or estimated rotor angular position.

Notably, the disclosed embodiments can be applied to estimate motor angular speed and rotor angular position of all types of multi-phase alternating current (AC) machines regardless of the machine type (e.g., both synchronous and asynchronous machines) or the number of machine phases.

FIGS. 2A-9 illustrate embodiments of methods, systems and apparatus for controlling operation of a multi-phase system that includes a multi-phase alternating current machine without using angular speed or position sensor.

Figure 2A:
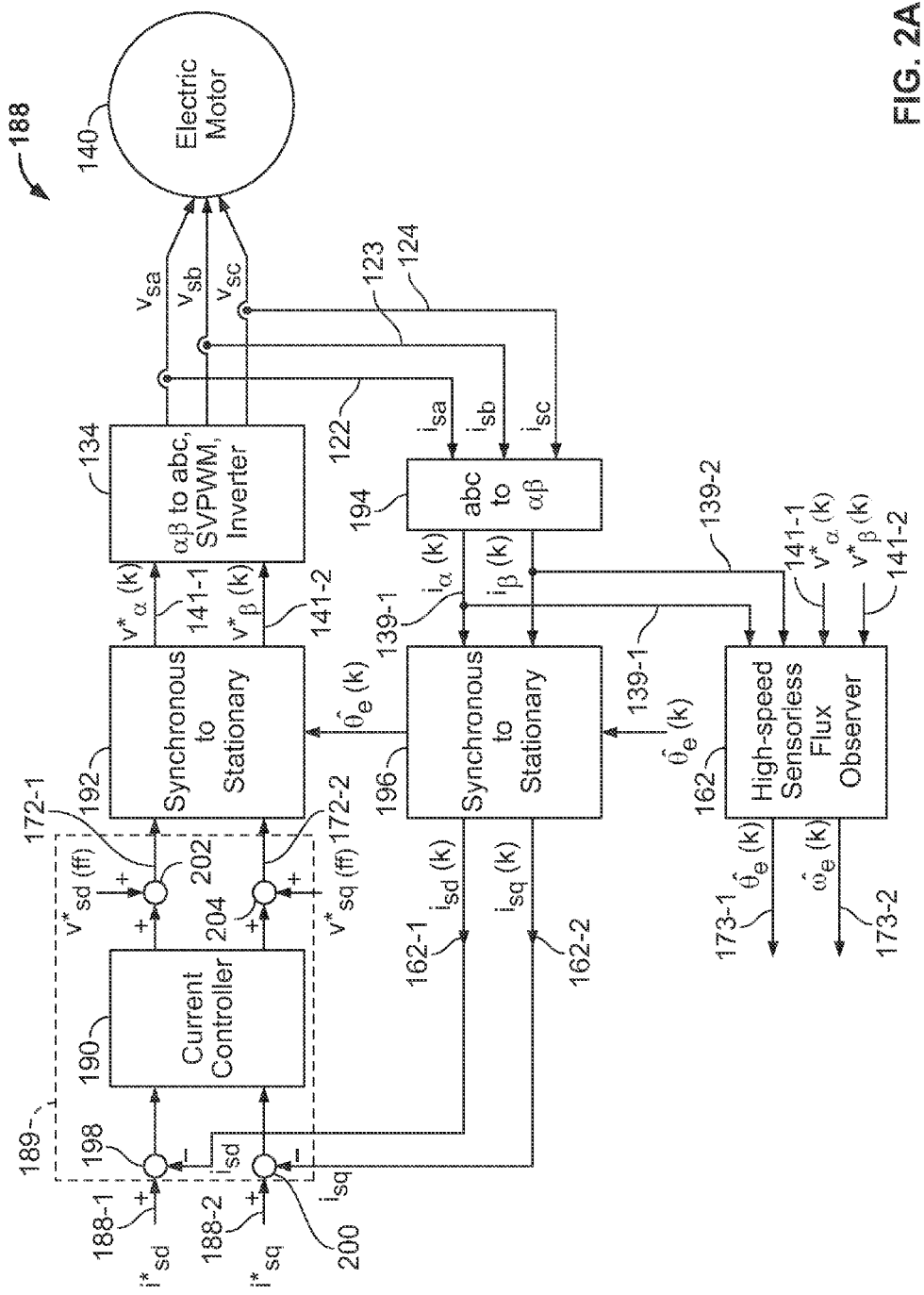
FIG. 2A is a block diagram of one example of a sensorless vector controlled motor drive system in accordance with one of the disclosed embodiments.

FIG. 2A is a block diagram of one example of a sensorless vector controlled motor drive system 188 in accordance with one of the disclosed embodiments. The system 188 controls a three-phase AC machine 140 via a three-phase pulse width modulated (PWM) inverter module 134 coupled to the three-phase AC machine 140 so that the three-phase AC machine 140 can efficiently use a DC input voltage (Vdc) provided to the three-phase PWM inverter module 134 by adjusting current commands that control the three-phase AC machine 140. In one particular implementation, the sensorless vector controlled motor drive system 188 can be used to control torque in a hybrid electric vehicle (HEV).

In the following description of one particular non-limiting implementation, the three-phase AC machine 140 is described as a three-phase AC powered motor 140; however, it should be appreciated that the illustrated embodiment is only one non-limiting example of the types of AC machines that the disclosed embodiments can be applied to, and further that the disclosed embodiments can be applied to any type of multi-phase AC machine that includes fewer or more than three phases.

The three-phase AC motor 140 is coupled to the three-phase PWM inverter module 134 via three inverter poles and generates mechanical power (torque×angular speed) based on three-phase sinusoidal current signals 122 ... 124 received from the PWM inverter module 134. As will be described below, an estimated rotor flux angular position ($\hat{\theta}_e(k)$) 173-1 of the three-phase AC motor 140 can be estimated without using an angular speed or position sensor by using sensorless estimation techniques as will be described below with reference to FIGS. 4-9.

Referring again to FIG. 2A, the sensorless vector control electric motor drive system 188 includes a synchronous frame current regulator module 189, a synchronous-to-stationary transformation module 192, a power inverter module 134, an abc reference frame-to-αβ reference frame (abc-to-αβ) transformation module 194, and a stationary-to-synchronous transformation module 196, and a high-speed sensorless flux observer 162.

Although not illustrated in FIG. 2A, a torque-to-current mapping module (not illustrated) typically receives a torque command signal (Te*) from a high level controller, an estimated electrical synchronous frequency ($\hat{\omega}_e(k)$) 173-2 that is generated at high-speed sensorless flux observer module 162, and the DC input voltage ($V_{DC}$) as inputs (along with possibly a variety of other system parameters depending upon implementation), and uses these inputs to generate a d-axis current command ($i_{sd}^*$) 188-1 and a q-axis current command ($i_{sq}^*$) 188-2. The d-axis current command signal ($i_{sd}^*$) 188-1 and the q-axis current command signal ($i_{sq}^*$) 188-2 are inputs to the 189. The synchronous reference frame d-axis and q-axis current command signals ($i_{sd}^*$, $i_{sq}^*$) 188 are DC commands that have a constant value as a function of time. Ideally, the d-axis current command signal ($i_{sd}^*$) 188-1 and the q-axis current command signal ($i_{sq}^*$) 188-2 will cause the motor 140 to generate the commanded torque (Te*) at the estimated electrical synchronous frequency ($\hat{\omega}_e(k)$) 173-2.

The abc-to-αβ transformation module 194 receives the measured three-phase stationary reference frame feedback stator currents ($i_{sa}$ ... $i_{sc}$) 122-123 that are sampled fedback from motor 140, and transforms them into two-phase currents. In one embodiment, the abc-to-αβ transformation module 194 performs an abc reference frame-to-αβ reference frame transformation to transform the three-phase stationary reference frame feedback stator currents ($i_{sa}$ ... $i_{sc}$) 122-124 into two-phase stationary reference frame feedback stator currents ($i_\alpha$, $i_\beta$) 139-1, 139-2, for example, by computing the following matrices shown in expression (14):

$$\begin{bmatrix} i_\alpha \\ i_\beta \end{bmatrix} = \begin{bmatrix} 2/3 & -1/3 & -1/3 \\ 0 & 1/\sqrt{3} & 1/\sqrt{3} \end{bmatrix} \begin{bmatrix} i_{sa} \\ i_{sb} \\ i_{sc} \end{bmatrix} \quad (14)$$

The abc-to-αβ transformation is well-known in the art and for sake of brevity will not be described in detail.

The stationary-to-synchronous transformation module 196 provides the rotational transformation (e.g., stationary to synchronous frames) with respect to the rotor flux angular position to change the two-phase stationary reference frame feedback stator currents ($i_\alpha$, $i_\beta$) 139-1, 139-2 into two-phase DC currents that are used as current feedback. In one embodiment, the stationary-to-synchronous transformation module 196 receives the two-phase stationary reference frame feedback stator currents ($i_\alpha$, $i_\beta$) 139-1, 139-2 and the estimated rotor flux angular position ($\hat{\theta}_e(k)$) 173-1 and processes (e.g., rotationally transforms or converts) the two-phase stationary reference frame feedback stator currents ($i_\alpha$, $i_\beta$) 139-1, 139-2 to generate a synchronous reference frame d-axis current signal ($i_{sd}$) 163-1 and a synchronous reference frame q-axis current signal ($i_{sq}$) 163-2. The processing can be performed, for example, by computing the following matrices shown in expression (15):

$$\begin{bmatrix} i_{sd} \\ i_{sq} \end{bmatrix} = \begin{bmatrix} \cos\theta_e & \sin\theta_e \\ -\sin\theta_e & \cos\theta_e \end{bmatrix} \begin{bmatrix} i_\alpha \\ i_\beta \end{bmatrix} \quad (15)$$

The process of stationary-to-synchronous conversion is well-known in the art and for sake of brevity will not be described in detail.

The synchronous frame current regulator module 189 includes a current controller 190 and subtraction modules 198, 200 and summer modules 202, 204.

The subtraction module 198 of the synchronous frame current regulator module 189 receives the synchronous reference frame d-axis current signal ($i_{sd}$) 163-1 and the d-axis current command ($i_{sd}$*) 188-1, and uses these signals to generate a current control error that is provided to the current controller 190. Similarly, the subtraction module 200 of the synchronous frame current regulator module 189 receives the synchronous reference frame q-axis current signal ($i_{sq}$) 163-2 and the q-axis current command ($i_{sq}$*) 188-2, and uses these signals to generate a current control error that is provided to the current controller 190.

The difference between the current command and the current feedback drives the current controller 190 to generate voltage commands ($v_{sd}$ and which are also DC quantities. In one embodiment, the current controller 190 coverts these inputs into corresponding voltage signals ($v^*_{sd(fb)}$ and $v^*_{sq(fb)}$) that are output to the summer modules 202, 204, where fb is used to identify that they are the voltages from a feedback control loop (e.g., current controller). The process of current to voltage conversion can be implemented using a Proportional-Integral (PI) controller, which is known in the art and for sake of brevity will not be described in detail.

The summer modules 202, 204 sum their respective inputs to generate a synchronous reference frame d-axis voltage command signal ($v_{sd}$*) 172-1 and a synchronous reference frame q-axis voltage command signal ($v_{sq}$*) 172-2, respectively. In one embodiment, at summer modules 202, 204, feedforward terms (or decoupling voltages) ($v^*_{sd(ff)}$, $v^*_{sq(ff)}$) are used to decouple the voltage induced by the flux inside the motor at the output of the current controller 190. The feedforward terms can be calculated from the flux tables, $\Psi_d$ and $\Psi_q$, per expressions (16) and (17) as follows:

$$v^*_{sd(ff)} = -\omega_r \Psi_q(i_{sd}, i_{sq}) \quad (16)$$

$$v^*_{sq(ff)} = \omega_r \Psi_d(i_{sd}, i_{sq}) \quad (17)$$

Although the commanded currents may be used in expressions (16) and (17), the decoupling voltages calculated using the commanded currents may result in oscillatory current control response at high angular speed operation.

The synchronous reference frame voltage command signals ($v_{sd}$*, $v_{sq}$*) 172 are DC commands that have a constant value as a function of time for steady state operation. Because the current commands are DC signals in the synchronous reference frame they are easier to regulate in comparison to AC stationary reference frame current commands.

The synchronous-to-stationary transformation module 192 receives the synchronous reference frame d-axis voltage command signal ($v_{sd}$*) 172-1 and the synchronous reference frame q-axis voltage command signal ($v_{sq}$*) 172-2 as inputs along with the estimated rotor flux angular position ($\hat{\theta}_e(k)$) 173-1, and performs a dq-to-αβ transformation to generate an α-axis stationary reference frame voltage command signal ($v_\alpha$*) 141-1 and a β-axis stationary reference frame voltage command signal ($v_\beta$*) 141-2. The stationary reference frame α-axis and β-axis voltage command signals ($v_\alpha$*, $v_\beta$*) 141-1, 141-2 are in the stationary reference frame and therefore have values that vary as a sine wave as a function of time. The process of synchronous-to-stationary conversion is well-known in the art and for sake of brevity will not be described in detail.

The inverter module 134 that includes αβ reference frame-to-abc reference frame (αβ-to-abc) transformation module, a pulse width modulation (PWM) module and a three-phase PWM inverter 135.

The αβ-to-abc transformation module (not illustrated) receives the stationary reference frame voltage command signals ($v_\alpha$*, $v_\beta$*) 141-1, 141-2, and based on these signals, generates stationary reference frame voltage command signals ($v_{sa}$* ... $v_{sc}$*) (also referred to as "phase voltage command signals") that are sent to the PWM module (not illustrated). The αβ-to-abc transformation is well-known in the art and for sake of brevity will not be described in detail.

The PWM module (not illustrated) controls pulse width modulation of the phase voltage command signals ($v_{sa}$* ... $v_{sc}$*). The PWM module modifies the phase voltage command signals ($v_{sa}$* ... $v_{sc}$*) based on duty cycle waveforms (that are internally generated within the PWM module) to generate the switching vector signals, which it provides to the three-phase PWM inverter module 135 to control the switching states of switches in PWM inverter 135 and generate three-phase voltage commands ($v_{sa}$* ... $v_{sc}$*) at each phase A, B, C. The particular modulation algorithm implemented in the PWM module can be any known modulation algorithm including Space Vector Pulse Width Modulation (SVPWM) techniques that are commonly used to control pulse width modulation (PWM) to create alternating current (AC) waveforms that drive the three-phase AC powered machine 140 at varying angular speeds based on the DC input 122.

The three-phase PWM inverter module 135 is coupled to the PWM module. The three-phase PWM inverter module 135 receives the DC input voltage (Vdc) 122 and switching vector signals, and uses them to generate three-phase alternating current (AC) voltage signal waveforms (($v_{sa}$ ... $v_{sc}$)) at inverter poles that drive the three-phase AC machine 140 at varying angular speeds in accordance with the estimated electrical synchronous frequency ($\hat{\omega}_e(k)$) 173-2. As will be appreciated by those skilled in the art, the three-phase PWM inverter module 135 must be controlled so that at no time are both switches in the same inverter sub-module or "leg" are turned on to prevent the DC supply from being shorted. As such, the switches in the same inverter sub-module are operated such that when one is off the other is on and vice versa.

The three-phase machine 140 receives the three-phase voltage signals generated by the PWM inverter 135 and generates a motor output at the commanded torque Te*. Although not illustrated in FIG. 2A, the system 188 may also include a gear coupled to and driven by a shaft of the three-phase AC machine 140. The measured feedback stator currents ($i_a$-$i_e$) 122-124 are sensed, sampled and provided to the abc-to-αβ transformation module 194 as described above.

The high-speed sensorless flux observer 162 receives the stationary reference frame feedback stator currents ($i_\alpha$, $i_\beta$) 139-1, 139-2 and the stationary reference frame α-axis and β-axis voltage command signals ($v_\alpha$*, $V_\beta$*) 141-1, 141-2, and based on these inputs, computes the estimated rotor flux angular position ($\hat{\theta}_e(k)$) 173-1 and the estimated electrical synchronous frequency ($\hat{\omega}_e(k)$) 173-2.

Figure 2B:
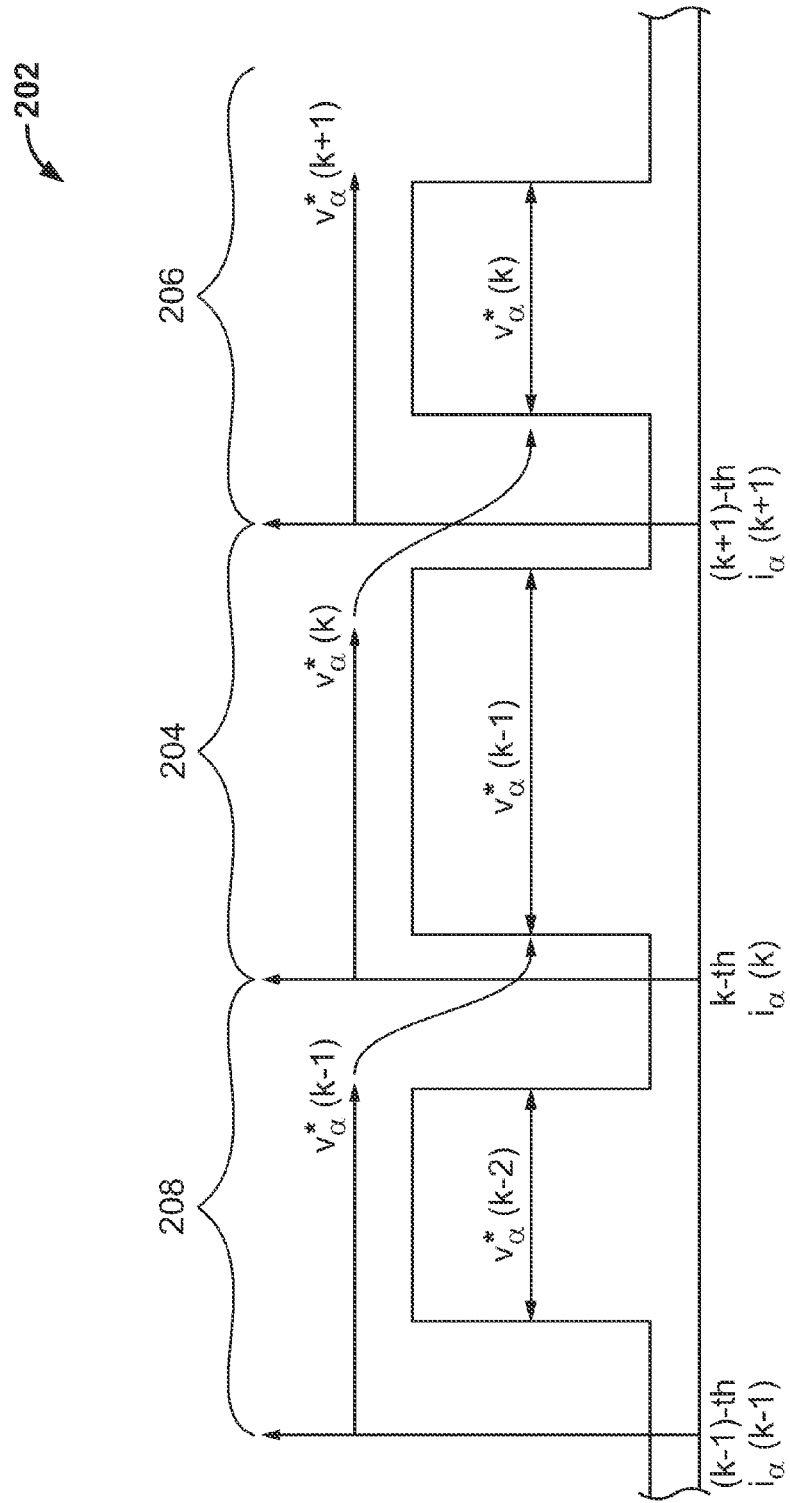
FIG. 2B illustrates a portion of a PWM signal generated by the inverter module and exemplary timing of current sampling according to one embodiment.

Generation and timing of a PWM signal will now be explained with reference to FIG. 2B. FIG. 2B illustrates a portion of a PWM signal 202 generated by the inverter module 134 and exemplary timing of current sampling according to one embodiment. The portion of the PWM signal 202 includes a first cycle 204, a second cycle 206, and a third cycle 208. It is noted that in any of the symbols used in description of FIGS. 2B and 4-9, the value k corresponds to particular sample point or a particular cycle of the PWM signal. Although the cycles in the signal 202 generally follow a sequential order (i.e., k−1, k, k+1, etc.), for illustrative purposes, the third cycle 208 is described as occurring immediately before the first cycle 204, and the first cycle 204 is described as occurring immediately before the second cycle 206.

The inverter module 134 has an inherent one-cycle delay caused by the PWM, which, if not accounted for, may result in control and estimation error. The voltage applied to the machine 140 during the first (or k-th) cycle 204 is calculated during the third (or (k−1)-th) cycle 208 and updated at the beginning of k-th cycle. For each cycle, the new voltage is applied at the beginning thereof, and at the same time, the machine current is sampled. For example, at the beginning of the first cycle 204, the machine current may be represented as $i_\alpha(k)$. The voltage applied to build $i_\alpha(k)$ is the voltage (i.e., $v^*_\alpha(k-2)$) applied during the third (or (k−1)-th) cycle 208, which is calculated during the (k−2)-th cycle (not shown). As such, a two-cycle delay occurs between a commanded voltage and the observance of that commanded voltage by the flux observer 162. Additionally, although every variable besides stationary voltage may be updated as shown in FIG. 2B (i.e., at the beginning of each cycle), the actual average voltage sought by the PWM signal 202 occurs at the mid-point of each cycle (or sampling period). This results in a delay of the voltage angle of the machine 140 that can in turn result in a voltage error during high frequency operation.

Figure 3:
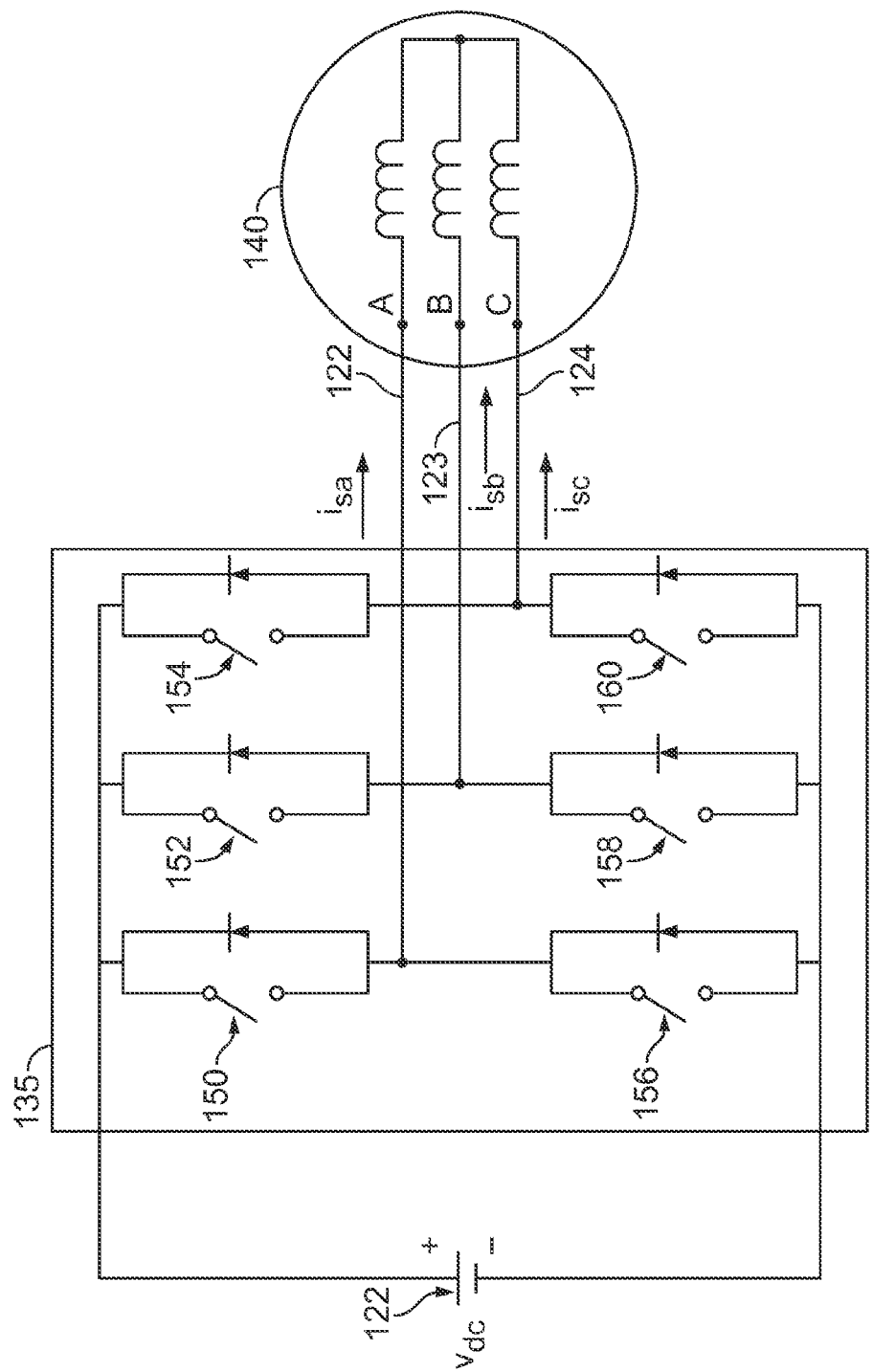
FIG. 3 is a schematic view that illustrates one exemplary implementation of a portion of an electric motor drive system of FIG. 2A in greater detail including a three-phase voltage source inverter connected to a three-phase AC motor.

Prior to describing operation details of the system 188, a more detailed description of one exemplary implementation of the three-phase voltage source inverter 135 and how it is connected to the three-phase AC motor 140 will be provided with reference to FIG. 3.

FIG. 3 is a schematic view that illustrates one exemplary implementation of a portion of an electric motor drive system 188 of FIG. 2A in greater detail including a three-phase voltage source inverter 135 connected to a three-phase AC motor 140. It should be noted that the three-phase voltage source inverter 135 and the three-phase motor 140 in FIG. 3 are not limited to this implementation; rather, FIG. 3 is merely one example of how the three-phase voltage source inverter 135 and the three-phase motor 140 in FIG. 2A could be implemented in one particular embodiment.

As illustrated in FIG. 3, the three-phase AC motor 140 has three stator or motor windings, connected to motor terminals A, B, C. The current into one motor winding flows out of the other two motor windings. The three-phase PWM inverter module 135 includes a capacitor (not illustrated) and three inverter sub-modules. The phase A, B, C inverter sub-modules are each coupled to one of the motor windings. Each inverter sub-module comprises a dual switch 150/156, 152/158, 154/160. As such, inverter 135 has six solid state controllable switching devices, and six diodes to appropriately switch a voltage source ($V_{DC}$) 122 and provide three-phase energization of the stator windings of the three-phase AC motor 140.

The resultant phase or stator currents ($i_{sa}$-$i_{sc}$) 122-124, flow through respective stator windings. Back electromotive force (EMF) voltages are generated in each of the stator windings.

As is well known, if the three-phase AC motor 140 is a permanent magnet motor, these back EMF voltages are the voltages induced in the respective stator windings by the rotation of the permanent magnet rotor. Although not shown, the three-phase AC motor 140 can be coupled to a drive shaft.

Although not illustrated, a closed loop motor controller can receive motor command signals and motor operating signals from the motor 140, and generate control signals for controlling the switching of solid state switching devices within the inverter sub-modules. By providing appropriate control signals to the individual inverter sub-modules, the closed loop motor controller controls switching of solid state switching devices within the inverter sub-modules and thereby controls the current outputs of the inverter sub-modules that are provided to motor windings. The voltages across the motor windings fluctuate over time depending on the open/close states of switches in the inverter sub-modules of the inverter module 135.

Some exemplary embodiments of the high-speed sensorless flux observer 162 will now be described below with reference to FIGS. 4-9.

Figure 4:
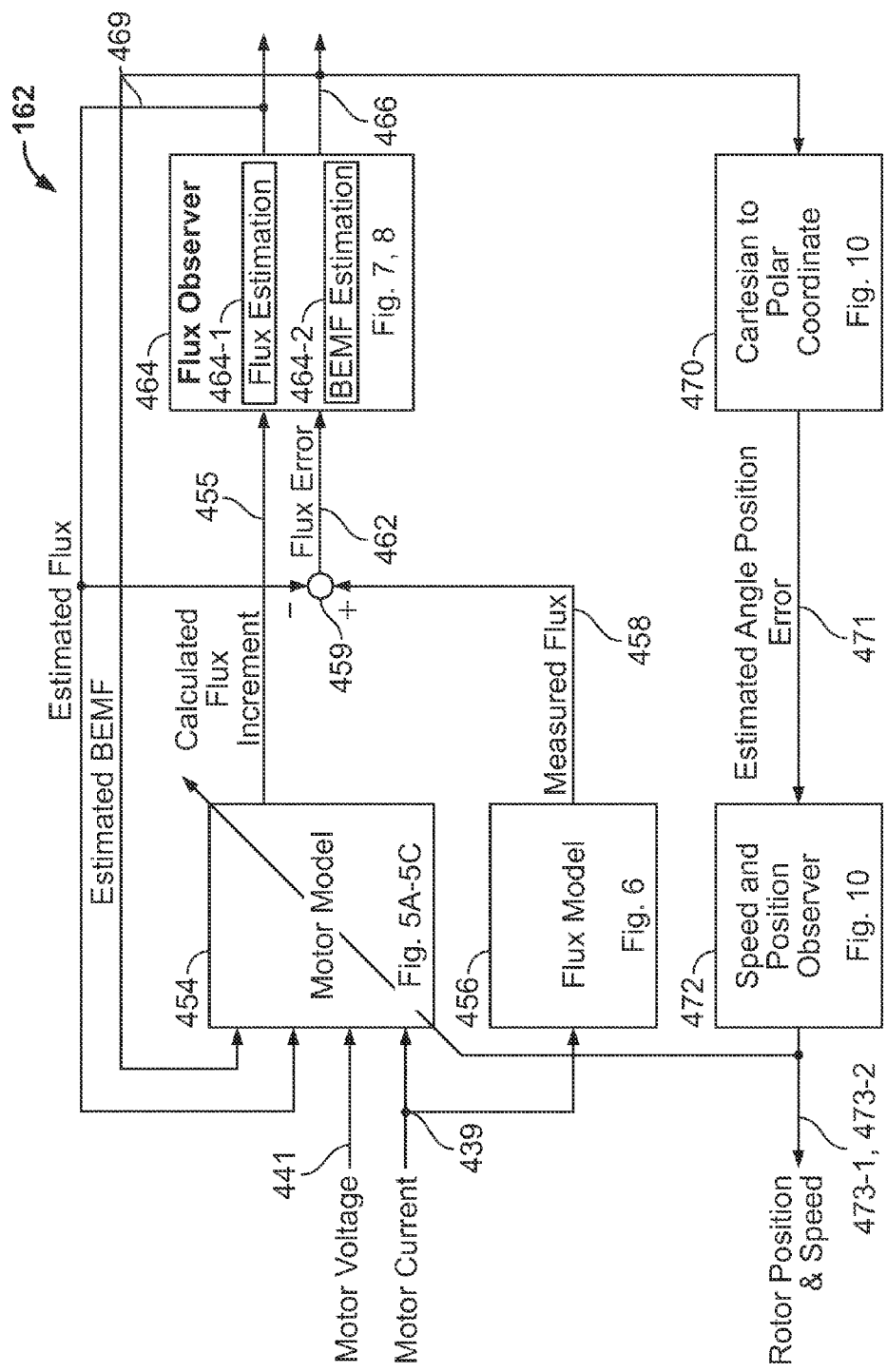
FIG. 4 is a block diagram illustrating a high-speed sensorless flux observer that is configured to estimate rotor angular speed and angular position of a motor according to one embodiment of the present invention.

FIG. 4 is a block diagram illustrating a high-speed sensorless flux observer 162 that is configured to estimate angular speed (as well as the electrical synchronous frequency) of a motor 140 and rotor flux position ($\theta_e$) and according to one embodiment of the present invention.

The high-speed sensorless flux observer 162 includes a motor model module 454, a flux model module 456, a summer module 459, a flux observer module 464, a coordinate conversion module 470, and an angular speed and position observer module 472.

Figure 5A:
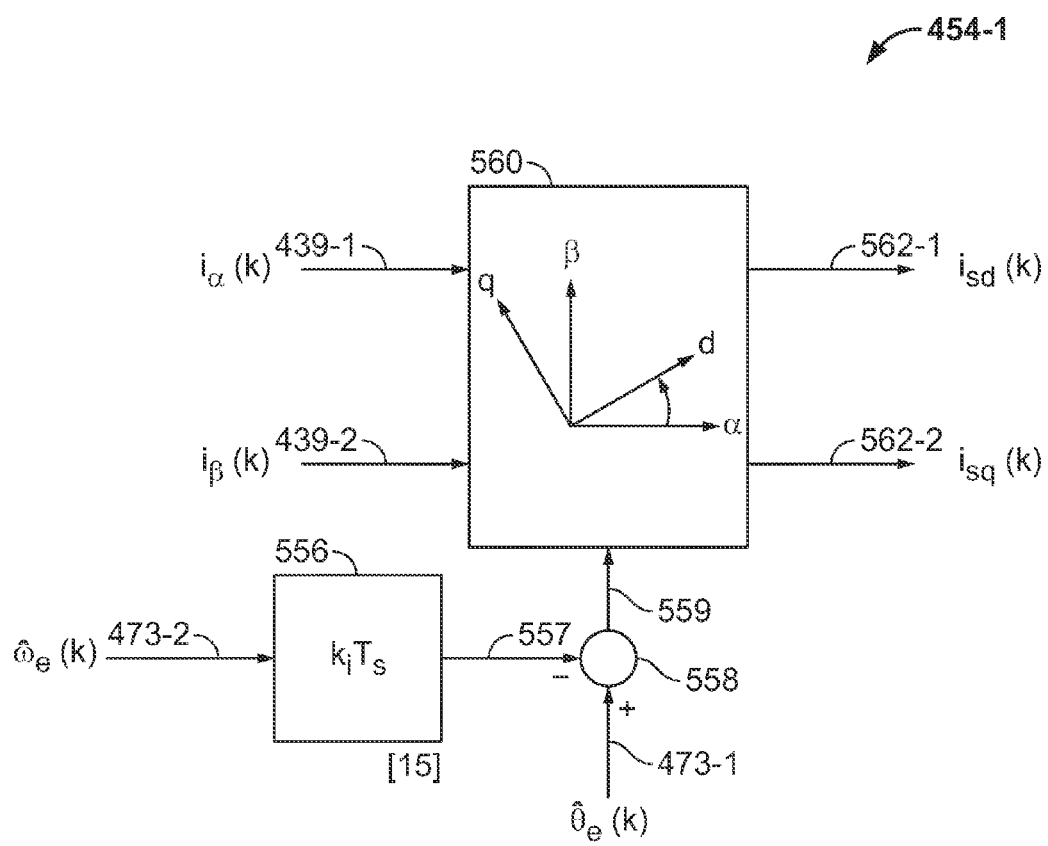
FIG. 5A illustrates a current transformation module of the motor model module that is illustrated in FIG. 4 according to one exemplary implementation.
Figure 5B:
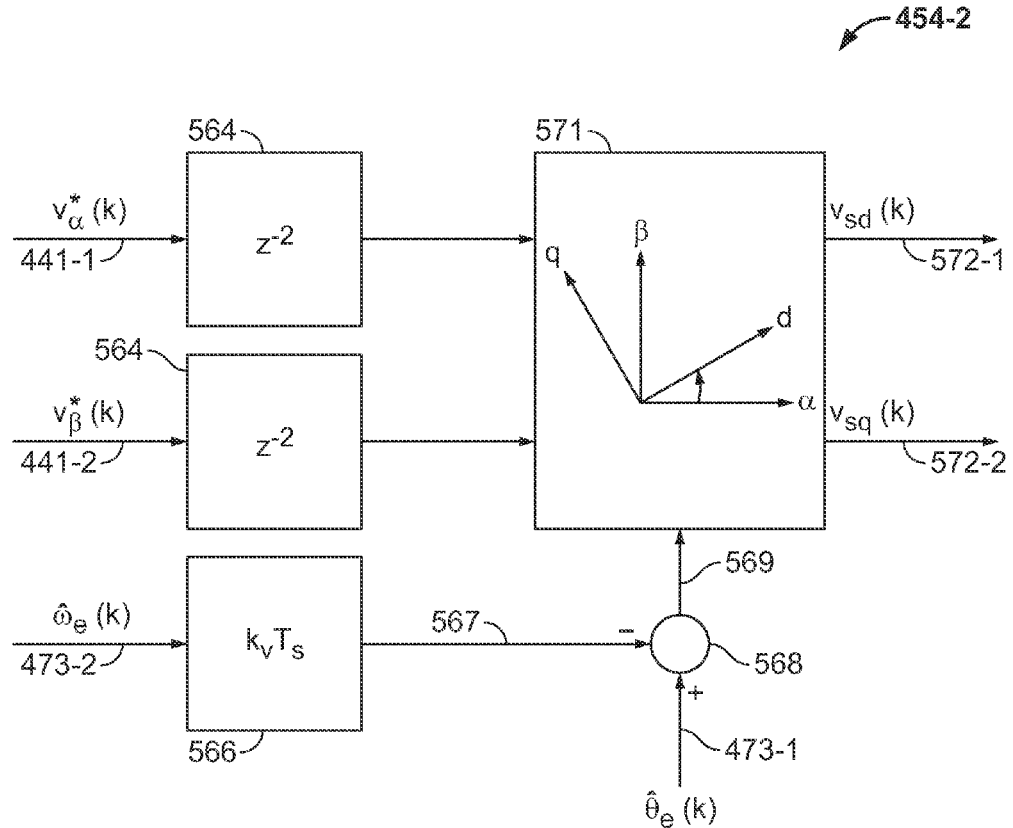
FIG. 5B illustrates a voltage transformation module of the motor model module that is illustrated in FIG. 4 according to one exemplary implementation.

The motor model module 454 receives motor currents 439, motor voltages 441, estimated BEMFs 466 from the flux observer module 464, and estimated fluxes 469 from the flux observer module 464. Each input to the motor model module 454 has a d-axis and a q-axis component, and in the description that follows, the motor currents 439 are transformed into synchronous reference frame two-phase feedback stator currents ($i_{sd}(k)$, $i_{sq}(k)$) 562-1, 562-2 (as shown in FIG. 5A), the motor voltages 441 are transformed into as synchronous reference frame d-axis stator voltage signal ($v_{sd}(k)$) 572-1 and the q-axis stator voltage signal ($v_{sq}(k)$) 572-2 (as shown in FIG. 5B), and the estimated back EMF values 466 can be referred to as an estimated d-axis BEMF value ($\hat{E}_{sd}(k)$) 466-1 and an estimated q-axis BEMF value ($\hat{E}_{sq}(k)$) 466-2, and the estimated flux 469 can also be referred to as an estimated d-axis stator winding flux ($\hat{\psi}_d(k)$) 469-1 and an estimated q-axis stator winding flux ($\hat{\psi}_q(k)$) 469-2). The motor model module 454 uses these inputs to generate calculated flux increments 455 for each sampling time (or each cycle of the PWM signal) which are sent to the flux observer module 464. In the description that follows, the calculated flux increments 455 can also be referred to as a calculated d-axis flux increment ($\Delta\hat{\psi}_d(k)$) 455-1 and a calculated q-axis flux increment ($\Delta\hat{\psi}_q(k)$) 455-2.

The flux model module 456 receives the motor currents 439, transforms them into synchronous reference frame two-phase feedback stator currents ($i_{sd}(k)$, $i_{sq}(k)$) 562-1, 562-2, that are then used to generate measured stator winding fluxes 458 (that corresponds to a measured flux quantity for the motor) from, for example, flux tables. The measured stator winding fluxes 458 can be referred to below as a d-axis stator winding flux ($\psi_d(k)$) 458-1 and a q-axis stator winding flux ($\psi_q(k)$) 458-2.

A summer module 459 subtracts the estimated stator winding fluxes ($\hat{\psi}_d(k)$ and $\hat{\psi}_q(k)$) 469 from the measured stator winding fluxes ($\psi_d(k)$ and $\psi_q(k)$) 458 to generate flux errors ($\epsilon_d$(k) and $\epsilon_q$(k)) 462. The flux error is calculated from the difference of the estimated stator winding flux 469 and the measured stator winding flux 458. The resulting flux errors 462 are used to drive the flux observer 464 as will be described below.

The flux error 463 and the calculated flux increments 455 are processed at the flux observer module 464. The flux observer module 464 uses the flux errors ($\epsilon_d$(k) and $\epsilon_q$(k)) 462 to generate the BEMF estimations ($\hat{E}_{sd}$(k) and $\hat{E}_{sq}$(k)) 466, and uses the calculated flux increments (($\Delta\hat{\psi}_d$(k)), ($\Delta\hat{\psi}_q$(k))) 455 to generate the estimated stator winding flux (($\hat{\psi}_d$(k)), ($\hat{\psi}_q$(k))) 469.

In one embodiment, when the machine 140 is a three-phase ac machine, the estimated stator winding flux 469 accounts for the flux generated by the windings in the stator of the motor 140, while the flux generated by the permanent magnets in the motor 140 is excluded. The estimated back EMF values 466 corresponds to the voltage induced by the rotor flux.

The angle of the estimated back EMF values 466 corresponds to an estimated rotor flux angular position error 471.

The coordinate conversion module 470 processes angle information for the estimated back EMF values 466 to extract the estimated rotor flux angular position error ($\Delta\theta_e$) 471. As will be described below, the coordinate conversion module 470 receives the estimated q-axis BEMF value ($\hat{E}_{sq}$(k−1)) 466-2 and generates a limited version of the estimated q-axis BEMF value ($\hat{E}_{sq}$(k−1)) 466-2, and then processes the estimated d-axis BEMF value ($\hat{E}_{sd}$(k−1)) 466-1 and the limited version of the estimated q-axis BEMF value ($\hat{E}_{sq}$(k−1)) 466-2 to generate the estimated rotor flux angular position error ($\Delta\theta_e$) 471.

The estimated rotor flux angular position error 471 is then sent to the angular speed and position observer module 472 to estimate the rotor angular position and angular speed, which are referred to herein as the estimated rotor flux angular position ($\hat{\theta}_e$(k)) 473-1 and the estimated electrical synchronous frequency ($\hat{\omega}_e$(k)) 473-2. Because the magnitude of the estimated back EMF values 466 is not used at the angular speed and position observer module 472 to estimate the angular speed and position, the temperature variation of the rotor, especially the permanent magnet, does not affect the estimation.

Exemplary Implementation of the Motor Model

Figure 5C:
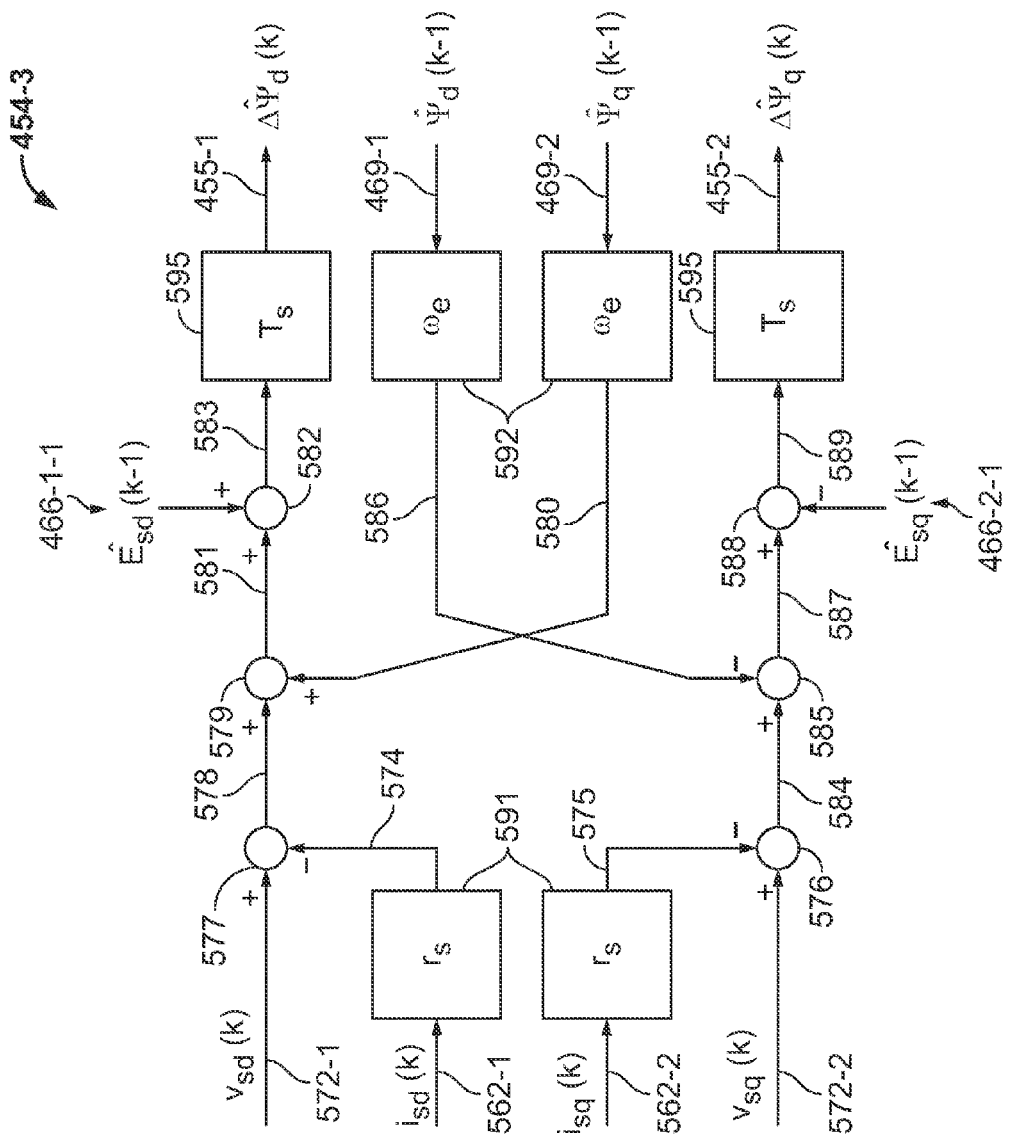
FIG. 5C illustrates a flux increment computation module of the motor model module that is illustrated in FIG. 4 according to one exemplary implementation.

In one implementation, the motor model module 454 of FIG. 4 can be implemented using a current transformation module 454-1, a voltage transformation module 454-2 and a flux increment computation module 454-3, as illustrated in FIGS. 5A, 5B, and 5C, respectively.

FIG. 5A illustrates a current transformation module 454-1 of the motor model module 454 that is illustrated in FIG. 4 according to one exemplary implementation. The current transformation module 454-1 shown in FIG. 5A includes a current compensation module 556, a summer 558, and a conversion module 560. The current compensation module 556 is used to compensate for a delay caused from use an analog filter. The current compensation module 556 receives estimated electrical synchronous frequency ($\hat{\omega}_e$(k) 473-2 and multiplies it by a gain (equal to the product to of a current-angle delay factor ($k_i$) and the sampling time ($T_s$)) to generate a compensation signal 557. The compensation signal 557 is subtracted from the estimated rotor flux angular position ($\hat{\theta}_e$(k)) 473-1 at the summer 558 to generate an adjustment signal 559. Based on the adjustment signal 559, the conversion module 560 converts the stationary reference frame two-phase feedback stator currents ($i_\alpha$(k), $i_\beta$(k)) 439-1, 439-2 into the synchronous reference frame d-axis and q-axis current signals ($i_{sd}$(k), $i_{sq}$(k)) 562-1, 562-2.

FIG. 5B illustrates a voltage transformation module 454-2 of the motor model module 454 that is illustrated in FIG. 4 according to one exemplary implementation. The voltage transformation module 454-2 shown in FIG. 5B includes delay modules 564, a voltage compensation module 566, a summer 568, and a coordinate conversion module 571.

Delay modules 564 delay the stationary reference frame α-axis and β-axis voltage command signals ($v_\alpha$*(k), $v_\beta$*(k)) 441-1, 441-2 by two-cycles (i.e., $z^{-2}$) to account for the two-cycle lag between commanded voltages and the observance of the associated flux. After being delayed two cycles, the stationary reference frame α-axis and β-axis voltage command signals ($v_\alpha$*(k−2), $V_\beta$*(k−2)) 441-1, 441-2 are passed to the coordinate conversion module 571.

The voltage compensation module 566 compensates for the delay of the voltage angle and is proportional to the operating angular speed. The voltage compensation module 566 receives estimated electrical synchronous frequency ($\hat{\omega}_e$(k)) 473-2 and multiplies it by a gain (equal to the product of a voltage-angle delay factor ($k_v$) and the sampling time ($T_s$)) to generate a compensation signal 567. The compensation signal 567 is subtracted from the estimated rotor flux angular position ($\hat{\theta}_e$(k)) 473-1 at the summer 569 to generate an adjustment signal 569.

The coordinate conversion module 571 processes the delayed stationary reference frame α-axis and β-axis voltage command signals ($v_\alpha$*(k), $v_\beta$*(k)) 441-1, 441-2 and the adjustment signal 569 to convert the stationary reference frame α-axis and β-axis voltage command signals ($v_\alpha$*(k), $v_\beta$*(k)) 441-1, 441-2 into the synchronous reference frame d-axis stator voltage signal ($v_{sd}$(k)) 572-1 and the synchronous reference frame q-axis stator voltage signal ($v_{sq}$(k)) 572-2.

Having converted the currents and voltages from the stationary reference frame to the synchronous reference frame, outputs of FIGS. 5A and 5B can then be processed further as shown in FIG. 5C.

FIG. 5C illustrates a flux increment computation module 454-3 of the motor model module 454 that is illustrated in FIG. 4 according to one exemplary implementation. The flux increment computation module 454-3 includes summers 576, 577, 579, 582, 585, 588, stator resistance value modules 591, operating frequency value modules 592, and sampling time value modules 595.

The (measured) synchronous reference frame d-axis current signal ($i_{sd}$(k)) 562-1 is multiplied by a resistance value of the stator resistance ($r_s$) at the stator resistance value module 591 to generate a voltage signal 574 that accounts for a voltage drop across a stator resistance. At summer module 577, the voltage signal 574 is then subtracted from the synchronous reference frame d-axis stator voltage signal ($v_{sd}$(k)) 572-1 to generate a net output voltage signal 578 that contributes to the stator flux. The estimated q-axis stator winding flux ($\hat{\psi}_q$(k−1)) 469-2 is multiplied by the electrical synchronous frequency ($\omega_e$) (of the motor) at module 592 to generate cross-coupling voltage signal 580 that corresponds to the voltage induced by estimated q-axis stator winding flux $\hat{\psi}_q$(k−1) 469-2. At summer 579, the voltage signal 580 is summed with the net output voltage 578 (from summer 577) to generate signal 581. At summer 582, the estimated d-axis BEMF value ($\hat{E}_{sd}$(k−1)) 466-1-1 at the kth−1 sampling period is summed with signal 581 to generate a voltage increment signal 583, which is then multiplied by a sampling period ($T_s$) at sampling time value module 595 to generate a calculated d-axis flux increment ($\Delta\hat{\psi}_d$(k)) 455-1 at the k-th sampling period. The calculated d-axis flux increment ($\Delta\hat{\psi}_d(k)$) 455-1 is the expected d-axis flux increment of the winding flux.

The (measured) synchronous reference frame q-axis current signal ($i_{sq}(k)$) 562-2 is multiplied by a resistance value of the stator resistance ($r_s$) at stator resistance value module 591 to generate a signal 575 that represents a voltage drop across the stator resistance. At summer module 576, the voltage signal 575 is then subtracted from the synchronous reference frame q-axis stator voltage signal ($v_{sq}(k)$) 572-2 to generate a net output voltage signal 584. The net voltage 584 (that is output from the summer module 576) contributes to the stator flux. The estimated d-axis stator winding flux ($\hat{\psi}_d(k-1)$) 469-1 is multiplied by the electrical synchronous frequency ($\omega_e$) (of the motor) at operating frequency value module 592 to generate cross-coupling voltage signal 586 that corresponds to the voltage induced by estimated d-axis stator winding flux ($\hat{\psi}_d(k-1)$) 469-1. At summer 585, the voltage signal 586 is subtracted from the net output voltage 584 from summer 576 to generate signal 587. At summer 588, the estimated q-axis BEMF value ($\hat{E}_{sq}(k-1)$) 466-2-1 (at the k-t-th sampling period) is subtracted from signal 587 to generate a voltage increment signal 589, which is then multiplied by a sampling period ($T_s$) at sampling time value module 595 to generate a calculated q-axis flux increment ($\Delta\hat{\psi}_q(k)$) 455-2 at the k-th sampling period. The calculated q-axis flux increment ($\Delta\hat{\psi}_q(k)$) 455-2 is the expected q-axis flux increment of the winding fluxes.

Exemplary Implementation of the Flux Model

Figure 6:
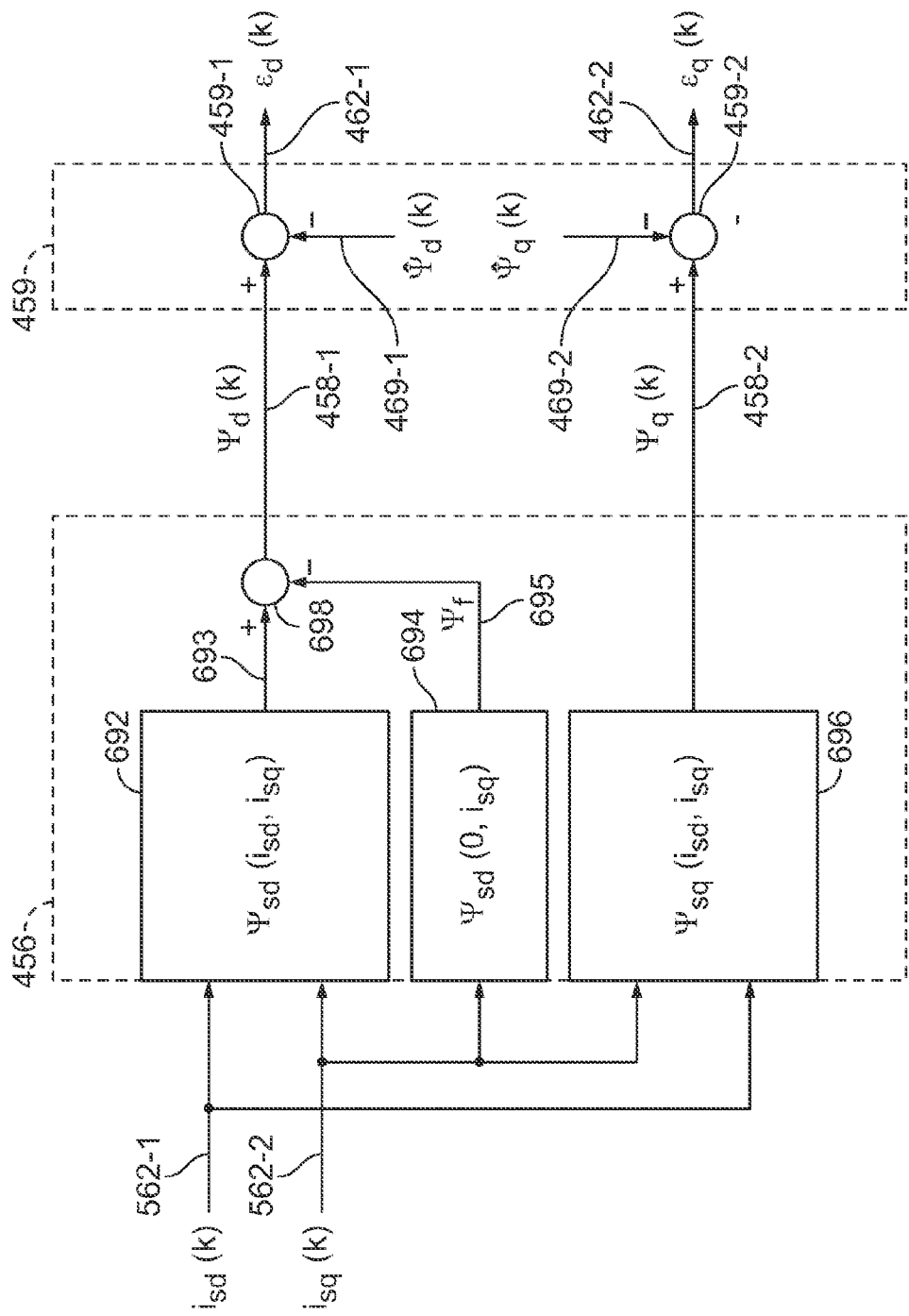
FIG. 6 illustrates one exemplary implementation of a flux model module and flux error calculation module that are illustrated in FIG. 4.

FIG. 6 illustrates one exemplary implementation of the flux model module 456 and summer module 459 that is illustrated in FIG. 4. Although not illustrated in FIG. 6, its noted that the flux model module 456 can include a current transformation module 454-1 that illustrated in FIG. 5A that receives the motor currents 439, and transforms them into synchronous reference frame two-phase feedback stator currents ($i_{sd}(k)$, $i_{sq}(k)$) 562-1, 562-2 that are used by the flux model module 456.

The flux model module 456 includes flux table modules 692, 694, 696 and summer module 698. Depending on the motor property, d-axis stator flux ($\Psi_{sd}$) and q-axis stator flux ($\Psi_{sd}$) can be non-linear functions of the stator current due to the magnetic saturation. In one embodiment, each of the flux tables 692, 694, 696 are implemented using two-dimensional flux tables, similar to those used for decoupling in a saturated motor. In such case, the 2-dimensional tables can be used to map the synchronous reference frame d-axis and q-axis current signals ($i_{sd}(k)$, $i_{sq}(k)$) 562-1, 562-2 to the d-axis stator winding flux ($\psi_d(k)$) 458-1 and the q-axis stator winding flux ($\psi_q(k)$) 458-2.

Flux table modules 692 and 694 use the same d-axis table with different input inputs.

The first d-axis stator flux ($\Psi_{sd}$) flux table module 692 receives the synchronous reference frame d-axis and q-axis current signals ($i_{sd}(k)$, $i_{sq}(k)$) 562-1, 562-2 as its inputs, and outputs the d-axis stator flux 693 at the operating point ($i_{sd}$, $i_{sq}$).

The second d-axis stator flux ($\Psi_{sd}$) flux table module 694 receives the synchronous reference frame q-axis current signal ($i_{sd}(k)$) 562-2 as its input, and outputs rotor flux ($\psi_f$) as observed at the stator winding 695. The rotor flux ($\psi_f$) as observed at the stator winding 695 corresponds to the d-axis stator flux when there is no d-axis current in case of the permanent magnet machine. In other words, in the context of a permanent magnet machine, there is no d-axis current, and it is assumed that the d-axis flux is the permanent magnet flux such that the rotor flux ($\psi_f$) 695 is separable from the d-axis flux table $\Psi_{sd}$.

At summer module 698, the rotor flux ($\psi_f$) as observed at the stator winding 695 is subtracted from the d-axis stator flux 693 to generate a d-axis stator winding flux ($\psi_d(k)$) 458-1. Thus, by subtracting the rotor flux ($\psi_f$) as observed at the stator winding 695 from the d-axis stator flux 693 at summer 698, d-axis stator winding flux ($\psi_d(k)$) 458-1 is obtained.

The q-axis stator flux ($\Psi_{sq}$) flux table module 696 receives the synchronous reference frame d-axis and q-axis current signals ($i_{sd}(k)$, $i_{sq}(k)$) 562-1, 562-2 as its inputs, and outputs a q-axis stator winding flux ($\psi_q(k)$) 458-2. In the context of a permanent magnet machine, $\psi_q$ can be directly obtained from the q-axis stator flux ($\Psi_{sq}$) flux table module 696 because the permanent magnet has no effect on the q-axis flux (e.g., the q-axis flux is independent of the permanent magnet flux).

The summer module 459 includes two summer sub-modules 459-1, 459-2. Summer sub-module 459-1 subtracts the estimated d-axis stator winding flux ($\hat{\psi}_d(k)$) 469-1 from the d-axis stator winding flux ($\psi_d(k)$) 458-1 to generate flux error ($\epsilon_d(k)$) 462-1. Summer sub-module 459-2 subtracts the estimated q-axis stator winding flux ($\hat{\psi}_q(k)$) 469-2 from the q-axis stator winding flux ($\psi_q(k)$) 458-2 to generate flux error ($\epsilon_q(k)$) 462-2. The resulting flux errors ($\epsilon_d(k)$, $\epsilon_q(k)$) 462-1, 462-2 are used to drive the flux observer 464 as will be described below with reference to FIGS. 7 and 8.

It is noted that when the machine 140 is non-saturated, the processing performed at 456 (blocks 692 through 698) can be replaced by equations (18) and (19).

$$\psi_d = L_d i_{sd} \tag{18}$$

$$\psi_q = L_q i_{sq} \tag{19}$$

In addition, it is noted that when the machine is an asynchronous machine, expressions (18) and (19) would be modified by replacing $L_d$ and $L_q$ in equation (18) and (19) with the stator transient inductance ($\sigma L_s$) as shown in Table 1.

Exemplary Implementation of the Flux Estimation Module

Figure 7:
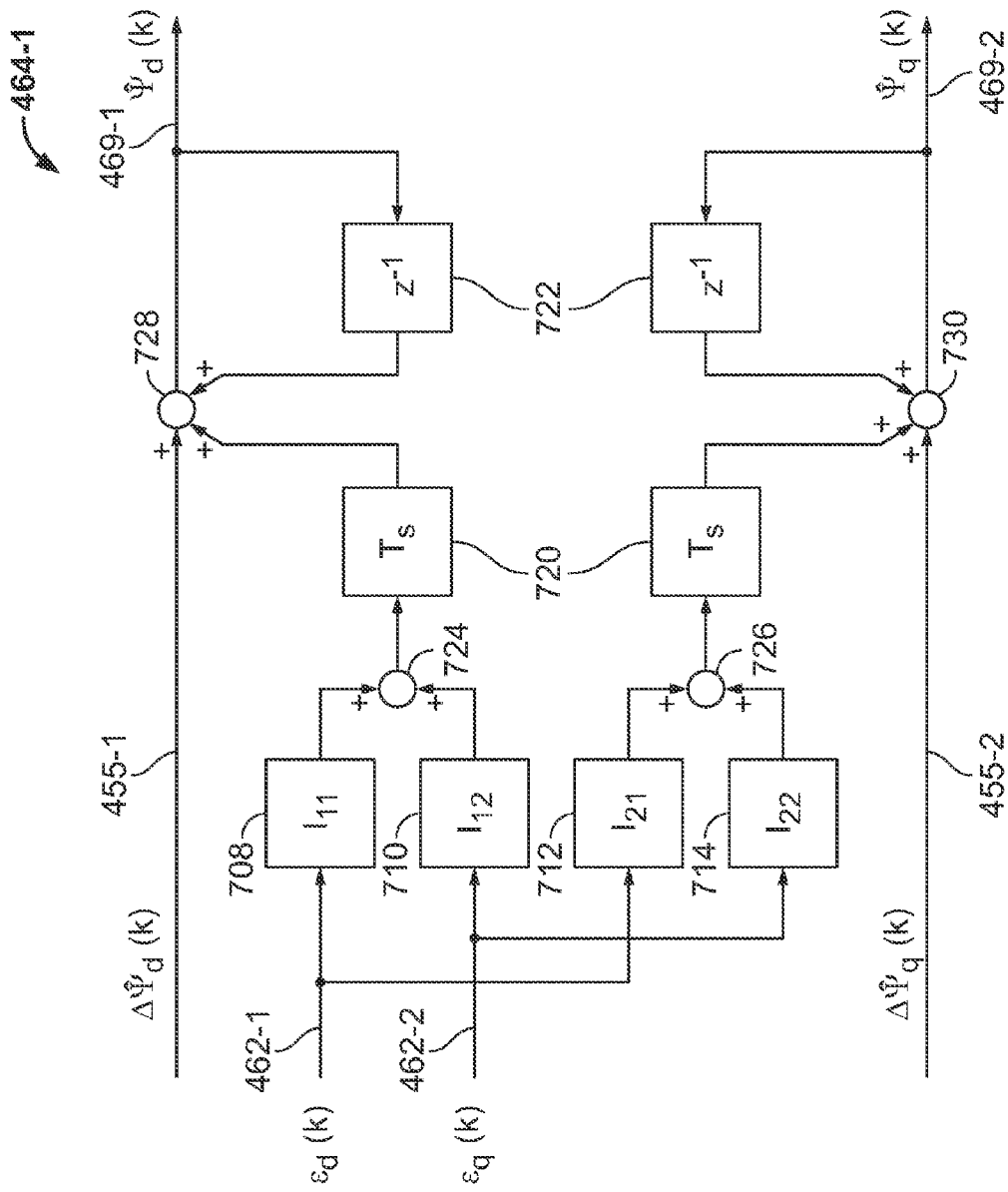
FIG. 7 illustrates one exemplary implementation of a flux estimation module of the flux observer module that is illustrated in FIG. 4.
Figure 8:
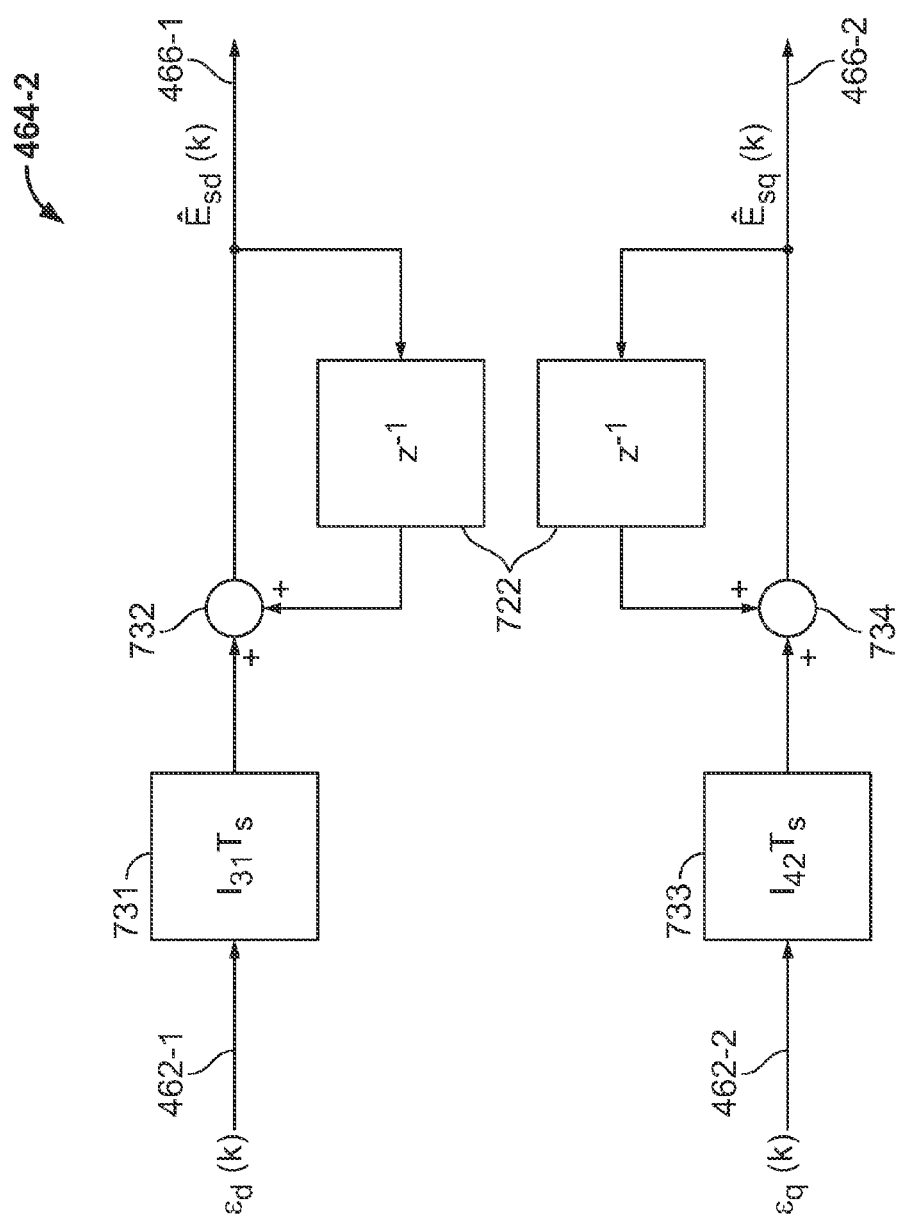
FIG. 8 illustrates one exemplary implementation of a BEMF estimation module of the flux observer module that is illustrated in FIG. 4.

FIG. 7 illustrates one exemplary implementation of the flux estimation module 464-1 of the flux observer module 464 that is illustrated in FIG. 4, and FIG. 8 illustrates one exemplary implementation of the BEMF estimation module 464-2 of the flux observer module 464 that is illustrated in FIG. 4.

The flux estimation module 464-1 includes flux observer gain modules 708, 710, 712, 714, sampling time modules 720, delay modules 722, and summers 728, 730.

The flux estimation module 464-1 receives the calculated d-axis flux increment ($\Delta\hat{\psi}_d(k)$) 455-1 and the calculated q-axis flux increment ($\Delta\hat{\psi}_q(k)$) 455-2 (for the k-th sampling period) from the motor model module 454, and the flux errors ($\epsilon_d(k), \epsilon_q(k)$) 462-1, 462-2 from the flux model module 456. The flux errors ($\epsilon_d(k), \epsilon_q(k)$) 462-1, 462-2 are multiplied by flux observer gains, $l_{11}$ and $l_{12}$, at the flux observer gain modules 708, 710, respectively, and the resulting products are then added at summer 724. Similarly, the flux errors ($\epsilon_d(k)$, $\epsilon_q(k)$) 462-1, 462-2 are multiplied by flux observer gains, $l_{21}$ and $l_{22}$, at the flux observer gain modules 712, 714, and the resulting products are then added at summer 726.

The outputs of the summers 124 and 126 are multiplied by the sampling time ($T_s$) at sampling time modules 720 before being sent to summers 728 and 730. The calculated d-axis flux increment ($\Delta\hat{\psi}_d(k)$) 455-1 and the calculated q-axis flux increment ($\Delta\hat{\psi}_q(k)$) 455-2 are also received by summers 728 and 730, respectively. The estimated stator winding fluxes, $\hat{\psi}_d(k)$ and $\hat{\psi}_q(k)$, are fed back into the summers 728 and 730 after being delayed one PWM cycle by the delays modules 722 as the estimated d-axis stator winding flux ($\hat{\psi}_d(k-1)$) 469-1 and estimated q-axis stator winding flux ($\hat{\psi}_q(k-1)$) 469-2 at the k−1th sampling period.

The calculated d-axis flux increment ($\Delta\hat{\psi}_d(k)$) 455-1, the output of the sampling module 720, and the estimated d-axis stator winding flux ($\hat{\psi}_d(k-1)$) 469-1 are then summed at the summer module 728 to generate estimated d-axis stator winding flux ($\hat{\psi}_d(k)$) 469-1 at the k-th sampling period. Similarly, the calculated q-axis flux increment ($\Delta\hat{\psi}_q(k)$) 455-2, the output of the other sampling module 720, and the estimated q-axis stator winding flux ($\hat{\psi}_q(k-1)$) 469-2 are then summed at the summer module 728 to generate estimated q-axis stator winding flux ($\hat{\psi}_q(k)$) 469-2 at the k-th sampling period.

Exemplary Implementation of the BEMF Estimation Module

Referring now to FIG. 8, the BEMF estimation module 464-2 includes gain modules 731, 733, delay modules 722, and summers 732, 734.

The gain module 731 multiplies the flux error ($\epsilon_d(k)$) 462-1 by a gain ($l_{31}T_s$) to generate a first product. The gain is the product of the flux observer gain ($l_{31}$) and the sampling time ($T_s$). The BEMF estimation is fed back into the summer 732 after being delayed one PWM cycle by the delay module 722. As such, the delay module 722 delays the estimated d-axis BEMF value ($\hat{E}_{sd}(k-1)$) 466-1 at the k−1-th sampling period by one cycle to generate a delayed feedback version of the estimated d-axis BEMF value ($\hat{E}_{sd}(k)$) 466-1 at the k-th sampling period. The summer 732 adds the first product (that was generated by the gain module 731) to the delayed feedback version of the estimated d-axis BEMF value ($\hat{E}_{sd}(k-1)$) 466-1 (at the k−1-th sampling period) to generate the estimated d-axis BEMF value ($\hat{E}_{sd}(k)$) 466-1 at the k-th sampling period.

Similarly, the gain module 733 multiplies the estimated q-axis BEMF value ($\hat{E}_{sq}(k-1)$) 462-2 by a gain ($l_{42}T_s$) to generate a second product. The gain is the product of the flux observer gain ($l_{42}$) and the sampling time ($T_s$). The q-axis BEMF estimation ($\hat{E}_{sq}(k)$) 466-2 is fed back into the summer 734 after being delayed one PWM cycle by the delay module 722. As such, the delay module 722 delays the estimated q-axis BEMF value ($\hat{E}_{sq}(k-1)$) 466-2 at the k−1-th sampling period by one cycle to generate a delayed feedback version of the estimated q-axis BEMF value ($\hat{E}_{sq}(k-1)$ 466-2 at the k-th sampling period. The summer 734 adds the second product (that was generated by the gain module 733) to the delayed feedback version of the estimated q-axis BEMF value ($\hat{E}_{sq}(k-1)$) 466-2 (at the k−1-th sampling period) to generate the estimated q-axis BEMF value ($\hat{E}_{sq}(k)$) 466-2 at the k-th sampling period.

Figure 9:
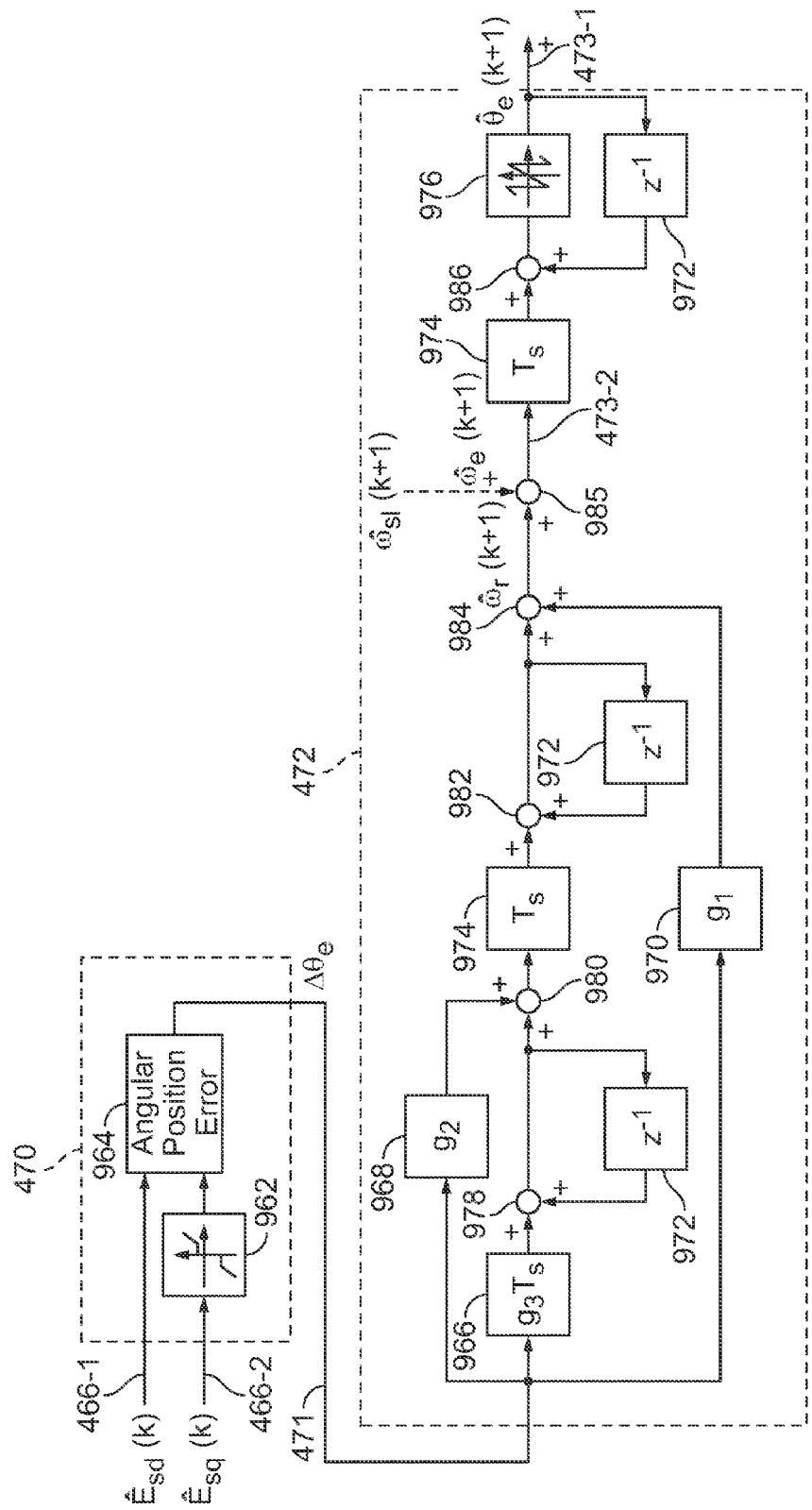
FIG. 9 illustrates one exemplary implementation of a coordinate conversion module and an angular speed and angular position observer module that are illustrated in FIG. 4.

Exemplary Implementation of the Coordinate Conversion Module and the Angular Speed and Position Observer Module FIG. 9 illustrates one exemplary implementation of the coordinate conversion module 470 and the angular speed and position observer module 472 that are illustrated in FIG. 4.

The coordinate conversion module 470 includes a BEMF limiter module 962 and an angular position error module 964.

The angular position error module 964 receives the estimated d-axis BEMF value ($\hat{E}_{sd}(k)$) 466-1 and the limited version of the estimated q-axis BEMF value ($\hat{E}_{sq}(k)$) 466-2 and outputs an estimated rotor flux angular position error ($\Delta\theta_e$) 471 to the angular position observer module 472. In one embodiment, the angular position error module 964 computes the estimated rotor flux angular position error ($\Delta\theta_e$) 471 depending on the polarity of the estimated electrical synchronous frequency ($\hat{\omega}_e$) using a two-dimensional arc-tangent function that can be represented by expressions (20) and (21) as follows:

$$\Delta\theta_e = \tan^{-1}(\hat{E}_{sq}, \hat{E}_{ds}) \text{ if } \hat{\omega}_e > 0 \quad (20)$$

$$\Delta\theta_e = \tan^{-1}(-\hat{E}_{sq}, -\hat{E}_{ds}) \text{ if } \hat{\omega}_e < 0 \quad (21)$$

If the estimated electrical synchronous frequency ($\hat{\omega}_e$) is exactly zero, then the system can not be observed, and the estimated rotor flux angular position error ($\Delta\theta_e$) 471 can not be determined.

At low angular speeds, the estimated q-axis BEMF value ($\hat{E}_{sq}(k)$) 466-2 may be too low to be used and thus may be limited by the BEMF limiter module 962 below a certain angular speed depending on the magnetic flux of the motor 140. The BEMF limiter module 962 receives the estimated q-axis BEMF value ($\hat{E}_{sq}(k)$) 466-2 and outputs a limited version of the estimated q-axis BEMF value ($\hat{E}_{sq}(k)$) 466-2 to the angular position error module 964. The limiting can be as represented by expression (22) as follows:

$$\hat{E}_{sq(lim)} = \begin{cases} \hat{E}_{sq} & \text{if } |\hat{E}_{sq}| \geq E_{sq(min)} \\ E_{sq(min)} \cdot \text{sgn}(\hat{E}_{sq}) & \text{if } |\hat{E}_{sq}| < E_{sq(min)} \end{cases} \quad (22)$$

If the angular speed is too low, the quality of the back EMF estimation can be bad due to the voltage distortion caused by the PWM inverter. As such, in those operating scenarios, the estimated q-axis BEMF value ($\hat{E}_{sq}(k)$) 466-2 in equations (20) and (21) could be replaced with a constant value so that the estimated rotor flux angular position error ($\Delta\theta_e$) 471 is limited to a finite value. When the machine 140 is a permanent magnet machine, except at low angular speeds where the absolute value of $\hat{E}_{sq}$ is limited by the BEMF limiter module 962, the angular position error module 964 provides a robust signal to track the angular speed and position of the motor irrespective of the magnitude of the permanent magnet, which is affected by the operating temperature, and the angular operating speed. Thus, it is possible to estimate the angular position and angular speed of the machine 140 regardless of the operating conditions of the machine 140.

Once the estimated rotor flux angular position error ($\Delta\theta_e$) 471 is determined using either expression (20) or (21), a 472 can generate an estimated electrical synchronous frequency for the next PWM cycle ($\hat{\omega}_e(k+1)$) 473-2, and an estimated rotor flux angular position for the next PWM cycle ($\hat{\theta}_e(k+1)$) 473-1.

The angular speed and position observer 472 includes gain modules 966, 968, and 970, delay modules 972, sampling time modules 974, an angular position limiter module 976, and summer modules 978-986. The angular speed and position observer 472 adjusts the estimated electrical synchronous frequency and rotor flux angular position to eventually or ideally drive the estimated rotor flux angular position error ($\Delta\theta_e$) 471 input to zero.

The gain modules 966, 968, 970 ($g_1$, $g_2$, $g_3T_s$) determine the dynamic behavior of the angular speed and position observer 472. The first gain module 966 multiplies the estimated rotor flux angular position error ($\Delta\theta_e$) 471 by a first gain ($g_3T_s$) to generate a first product. The first delay module 972 generates a one-cycle delayed version of a first sum, and the first summer module 978 sums the first product and the one-cycle delayed version of the first sum to generate a first sum. The second gain module 968 ($g_2$) multiplies the estimated rotor flux angular position error ($\Delta\theta_e$) 471 by a second gain ($g_3T_s$) to generate a second product. The second summer module 980 sums the second product with the first sum to generate a second sum. At the first sampling time module 974, the second sum is then multiplied by the sampling time interval ($T_s$) to generate a third product. The second delay module 972 generates a one-cycle delayed version of the third sum, and the third summer module 982 sums the third product with the one-cycle delayed version of the third product to generate the third sum. The third gain module 970 multiplies the estimated rotor flux angular position error ($\Delta\theta_e$) 471 by a third gain ($g_1$) to generate a fourth product. The fourth summer module 984 sums the fourth product with the third sum to generate a fourth sum. The fourth sum is an estimated rotor frequency for the next PWM cycle ($\hat{\omega}_r(k+1)$).

As noted above, the angular speed and position observer module 472 can be used in conjunction with both synchronous and asynchronous machines. In case of the asynchronous machine (e.g., induction machine), the rotor angular speed is not same as the angular speed of the rotating flux (or flux angular speed) ($\omega_e$). To get the flux angular speed for an asynchronous machine, a slip frequency ($\omega_{s1}$) should be added. The slip frequency can be calculated per expression (23) below, and the sum of the rotor angular speed and the slip frequency give the flux angular speed per expression (24) below.

$$\omega_{sl} = \frac{r_r L_m}{L_r} \cdot \frac{i_{sq}}{\Psi_{dr}} \quad (23)$$

$$\omega_e = \omega_r + \omega_{sl} \quad (24)$$

By contrast, for a synchronous machine (e.g., a surface mounted permanent magnet (SMPM) motor, an interior permanent magnet (IPM) motor or a synchronous reluctance motor), the slip frequency ($\omega_{s1}$) of expression (24) can be set to zero.

As such, the fifth summer module 985 sums the estimated rotor frequency for the next PWM cycle ($\hat{\omega}_r(k+1)$) with an estimated slip frequency for the next PWM cycle ($\hat{\omega}_{s1}(k+1)$) to generate the estimated electrical synchronous frequency for the next PWM cycle ($\hat{\omega}_e(k+1)$) 473-2. For an asynchronous machine, the electrical synchronous frequency ($\omega_e$) in radians/second is equal to the sum of the rotor frequency ($\omega_r$) in radians/second and a slip frequency ($\omega_{s1}$) in radians/second (i.e., $\omega_e=\omega_r+\omega_{s1}$). As such, when the machine 140 is an asynchronous machine, the estimated slip frequency for the next PWM cycle ($\hat{\omega}_{s1}(k+1)$) must be taken into account. When the machine 140 is a synchronous machine, the estimated slip frequency for the next PWM cycle ($\hat{\omega}_{s1}(k+1)$) will necessarily be equal to zero (0).

The second sampling time module 974, the sixth summer module 986, the angular position limiter module 976, the third delay module 972 collectively form an integrator that integrates the estimated electrical synchronous frequency for the next PWM cycle ($\hat{\omega}_e(k+1)$) 473-2 to generate the estimated rotor flux angular position for the next PWM cycle ($\hat{\theta}_e(k+1)$) 473-1.

To explain further, second sampling time module 974 multiplies the estimated electrical synchronous frequency for the next PWM cycle ($\hat{\omega}_e(k+1)$) 473-2 by the sampling time interval ($T_s$) to generate a fifth product. The third delay module 972 generates a one-cycle delayed version of the estimated rotor flux angular position for the next PWM cycle ($\hat{\theta}_e(k+1)$) 473-1, and the sixth summer module 986 sums the fifth product with the one-cycle delayed version of the estimated rotor flux angular position for the next PWM cycle ($\hat{\theta}_e(k+1)$) 473-1 to generate a fifth sum (i.e., an integrated value of the estimated rotor flux angular position for the next PWM cycle ($\hat{\theta}_e(k+1)$) 473-1). The angular position limiter module 976 limits the fifth sum within ±180° of the electrical angle. The estimated electrical synchronous frequency for the next PWM cycle ($\hat{\omega}_e(k+1)$) 473-2 and the estimated rotor flux angular position for the next PWM cycle ($\hat{\theta}_e(k+1)$) 473-1 are then used during the next sampling period to meet the timing sequence.

In one exemplary implementation, the multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system that includes a multi-phase alternating current machine without using angular speed or position sensor. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

In addition, the electric machine described above and the power inverter may have different numbers of phases, such as two or more. Other forms of power sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
generating an estimated rotor flux angular position error based on estimated back electromotive force (EMF) values; and
generating, based on the estimated rotor flux angular position error, an estimated rotor frequency for a next pulse width modulation (PWM) cycle; an estimated electrical synchronous frequency for the next PWM cycle by summing the estimated rotor frequency for the next PWM cycle and an estimated slip frequency for the next PWM cycle; and an estimated rotor flux angular position for the next PWM cycle based on the estimated electrical synchronous frequency for the next PWM cycle.

2. A method according to claim 1, further comprising:
generating estimated stator winding flux values based on calculated flux increments; and
generating the estimated back EMF values based on flux errors, wherein an angle of the estimated back EMF values corresponds to the estimated rotor flux angular position error.

3. A method according to claim 2, further comprising:
subtracting the estimated stator winding flux values from measured stator winding flux values to generate the flux errors.

4. A method according to claim 3, further comprising:
generating the measured stator winding flux values based on motor currents.

5. A method according to claim 4, further comprising:
generating the calculated flux increments based on the motor currents and motor voltages, the estimated back EMF values and the estimated stator winding flux values.

6. A method according to claim 5, wherein the motor currents are synchronous reference frame two-phase feedback stator currents, wherein the motor voltages are synchronous reference frame d-axis and q-axis stator voltage signals, wherein the estimated BEMF values are estimated d-axis and q-axis BEMF values, wherein the estimated stator winding flux values are an estimated d-axis and q-axis stator winding flux, wherein the calculated flux increments for each sampling time are calculated d-axis and q-axis flux increments, and wherein the measured stator winding flux values are a d-axis stator winding flux and a q-axis stator winding flux.

7. A method, comprising:
generating an estimated rotor flux angular position error based on estimated back electromotive force (EMF) values; and
wherein the estimated BEMF values are estimated d-axis and q-axis BEMF values, and wherein generating an estimated rotor flux angular position error based on estimated back electromotive force (EMF) values, comprises:
limiting the estimated q-axis BEMF value when the estimated q-axis BEMF value is below a threshold to generate a limited version of the estimated q-axis BEMF value; and
computing a two-dimensional arc-tangent function that depends on polarity of an electrical synchronous frequency ($\omega_e$) using the estimated d-axis BEMF value and the estimated q-axis BEMF value to generate the estimated rotor flux angular position error; and
generating, based on the estimated rotor flux angular position error, at least two of: an estimated rotor flux angular position, an estimated rotor frequency, and an estimated electrical synchronous frequency.

8. A method, comprising:
generating an estimated rotor flux angular position error based on estimated back electromotive force (EMF) values; and
generating, based on the estimated rotor flux angular position error, at an estimated rotor flux angular position and an estimated electrical synchronous frequency, wherein generating the estimated rotor flux angular position and the estimated electrical synchronous frequency comprises:
applying a complex gain to the estimated rotor flux angular position error to generate an estimated electrical synchronous frequency for a next PWM cycle, wherein the estimated electrical synchronous frequency for the next PWM cycle is either: an estimated rotor frequency for the next PWM cycle, or a sum of the estimated rotor frequency for the next PWM cycle and an estimated slip frequency for the next PWM cycle; and
generating, based on the estimated electrical synchronous frequency for the next PWM cycle, the estimated rotor flux angular position for the next PWM cycle.

9. A sensorless flux observer, comprising:
a coordinate conversion module configured to generate an estimated rotor flux angular position error based on estimated back electromotive force (EMF) values; and
an angular speed and position observer module configured to generate, based on the estimated rotor flux angular position error, an estimated rotor frequency for a next pulse width modulation (PWM) cycle; an estimated electrical synchronous frequency for the next PWM cycle by summing the estimated rotor frequency for the next PWM cycle and an estimated slip frequency for the next PWM cycle; and an estimated rotor flux angular position for the next PWM cycle based on the estimated electrical synchronous frequency for the next PWM cycle.

10. A sensorless flux observer according to claim 9, wherein the estimated BEMF values are estimated d-axis and q-axis BEMF values, and wherein k is a sample index for each cycle of a pulse width modulation (PWM) signal.

11. A sensorless flux observer according to claim 9, further comprising:
a flux observer module configured to generate estimated stator winding flux values based on calculated flux increments, and to generate the estimated back EMF values based on flux errors, wherein an angle of the estimated back EMF values corresponds to the estimated rotor flux angular position error.

12. A sensorless flux observer according to claim 11, wherein the estimated stator winding flux values are an estimated d-axis and q-axis stator winding flux, wherein the calculated flux increments for each sampling time are calculated d-axis and q-axis flux increments.

13. A sensorless flux observer according to claim 11, further comprising:
a summer module configured to subtract the estimated stator winding flux values from measured stator winding flux values to generate flux errors.

14. A sensorless flux observer according to claim 13, wherein the measured stator winding flux values are a d-axis stator winding flux and a q-axis stator winding flux.

15. A sensorless flux observer according to claim 13, further comprising:
a flux model module configured to generate the measured stator winding flux values based on motor currents.

16. A sensorless flux observer according to claim 15, wherein the motor currents are synchronous reference frame two-phase feedback stator currents.

17. A sensorless flux observer according to claim 11, further comprising:
a motor model module configured to generate the calculated flux increments based on motor currents and motor voltages, estimated back EMF values and estimated stator winding flux values from the flux observer module.

18. A sensorless flux observer according to claim 17, wherein the motor currents are synchronous reference frame two-phase feedback stator currents, wherein the motor voltages are synchronous reference frame d-axis and q-axis stator voltage signals, wherein the estimated BEMF values are estimated d-axis and q-axis BEMF values, wherein the estimated stator winding flux values are an estimated d-axis and q-axis stator winding flux, wherein the calculated flux increments for each sampling time are calculated d-axis and q-axis flux increments.

19. A high-speed sensorless flux observer, comprising:
a motor model module configured to generate calculated flux increments based on motor currents and motor voltages, estimated back EMF values and estimated stator winding flux values;
a flux model module configured to generate measured stator winding flux values based on the motor currents;

a summer module configured to subtract the estimated stator winding flux values and the measured stator winding flux values to generate flux errors;

a flux observer module configured to generate the estimated stator winding flux values based on the calculated flux increments, and to generate the estimated back EMF values based on the flux errors, wherein an angle of the estimated back EMF values corresponds to an estimated rotor flux angular position error;

a coordinate conversion module configured to generate the estimated rotor flux angular position error based on the estimated back EMF values; and an angular speed and position observer module configured to generate, based on the estimated rotor flux angular position error, an estimated rotor frequency for a next pulse width modulation (PWM) cycle; an estimated electrical synchronous frequency for the next PWM cycle by summing the estimated rotor frequency for the next PWM cycle and an estimated slip frequency for the next PWM cycle; and an estimated rotor flux angular position for the next PWM cycle based on the estimated electrical synchronous frequency for the next PWM cycle.

20. A high-speed sensorless flux observer according to claim 19, wherein the motor currents are synchronous reference frame two-phase feedback stator currents, wherein the motor voltages are synchronous reference frame d-axis and q-axis stator voltage signals, wherein the estimated BEMF values are estimated d-axis and q-axis BEMF values, wherein the estimated stator winding flux values are an estimated d-axis and q-axis stator winding flux, wherein the calculated flux increments for each sampling time are calculated d-axis and q-axis flux increments, wherein the measured stator winding flux values are a d-axis stator winding flux and a q-axis stator winding flux.

* * * * *